(12) United States Patent
Itoh et al.

(10) Patent No.: US 6,471,358 B1
(45) Date of Patent: Oct. 29, 2002

(54) LIGHTING DEVICE AND PROJECTOR

(75) Inventors: Yoshitaka Itoh; Toshiaki Hashizume, both of Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/557,768

(22) Filed: Apr. 25, 2000

Related U.S. Application Data

(63) Continuation of application No. 09/051,916, filed on Apr. 27, 1998, now Pat. No. 6,109,752.

(30) Foreign Application Priority Data

Aug. 26, 1996 (JP) .............................. 8-224225
Jul. 22, 1997 (JP) .............................. 9-196090

(51) Int. Cl.$^7$ .............................. G03B 21/28
(52) U.S. Cl. .............................. 353/98; 353/31; 353/94
(58) Field of Search .............................. 353/20, 31, 34, 353/37, 38, 85, 94, 98, 99, 102; 362/19, 231, 241, 247, 346; 349/5, 8, 9

(56) References Cited

U.S. PATENT DOCUMENTS 5,418,583 A * 5/1995 Masumoto .................... 353/38
5,669,686 A * 9/1997 Moon .......................... 353/98
6,109,752 A * 8/2000 Itoh et al. ..................... 353/98

FOREIGN PATENT DOCUMENTS

JP 62-79415 * 4/1987
JP 6-265887 * 9/1994

* cited by examiner

Primary Examiner—William Dowling
(74) Attorney, Agent, or Firm—Oblon, Spivak, McClelland, Maier & Neustadt, P.C.

(57) ABSTRACT

The present invention provides a lighting device that has two lamp units and is suitable for a light source of a projector-type display apparatus to realize bright illumination, and also a projector-type display apparatus with such a lighting device incorporated therein. The lighting device includes a light source unit and an integrator optical system and enables an illumination area to be illuminated uniformly and evenly with the light emitted from the light source unit and transmitted via the integrator optical system. The light source unit includes a pair of lamp units arranged in parallel, and a reflector of each lamp unit has a contour with both sides cut off. The pair of lamp units are preferably arrayed in a direction perpendicular to a longitudinal direction of the illumination area. This structure realizes a small-sized, compact lighting device with a high quantity of output light. Application of such a lighting device to the projector-type display apparatus enables uniform and bright projection images to be produced.

8 Claims, 21 Drawing Sheets

Fig. 6(A) WAVELENGTH DISTRIBUTION CHARACTERISTICS OF LIGHT EMITTED FROM LAMP UNIT 21A
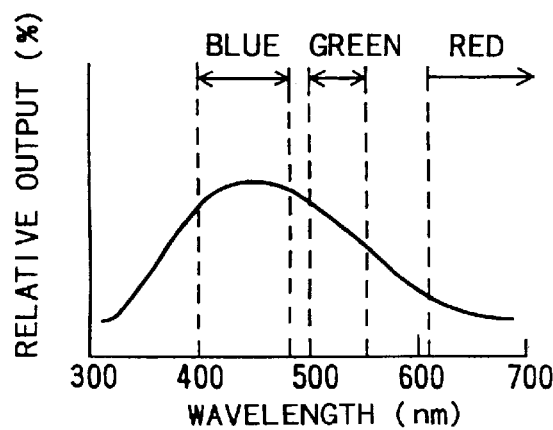
Fig. 6(B) WAVELENGTH DISTRIBUTION CHARACTERISTICS OF LIGHT EMITTED FROM LAMP UNIT 21B
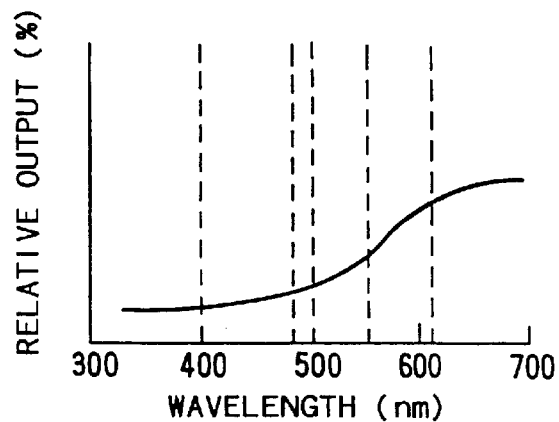
Fig. 6(C) WAVELENGTH DISTRIBUTION CHARACTERISTICS OF LIGHT EMITTED FROM LIGHTING DEVICE 1
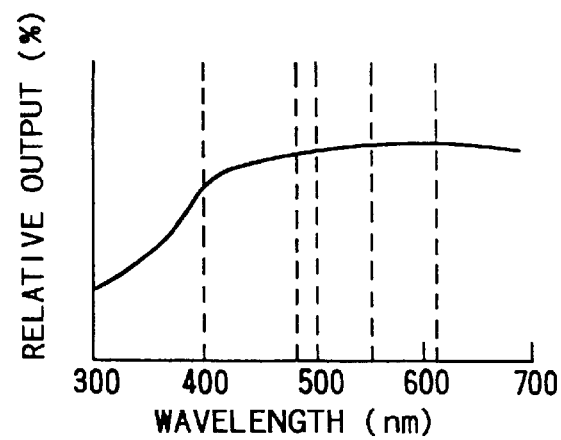

Fig. 7

LIGHTING MODE

| MODE | LAMP UNIT 21A | LAMP UNIT 21B |
|---|---|---|
| 0 | OFF | OFF |
| 1 | ON | OFF |
| 2 | OFF | ON |
| 3 | ON | ON |

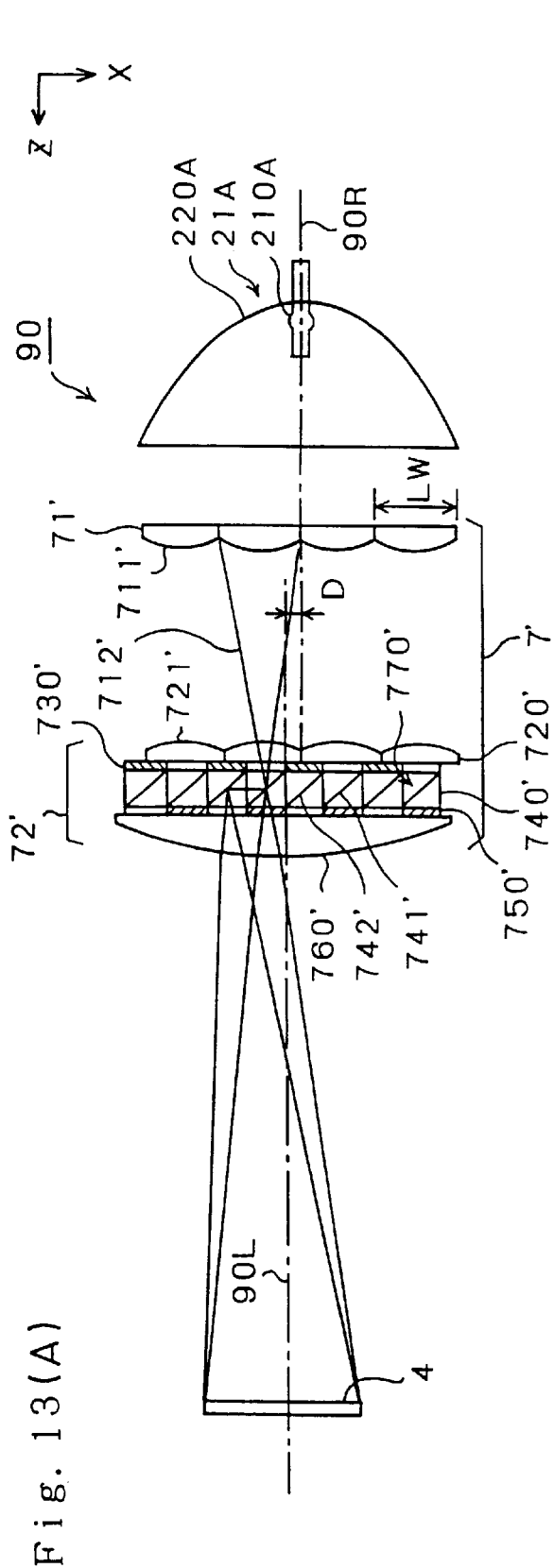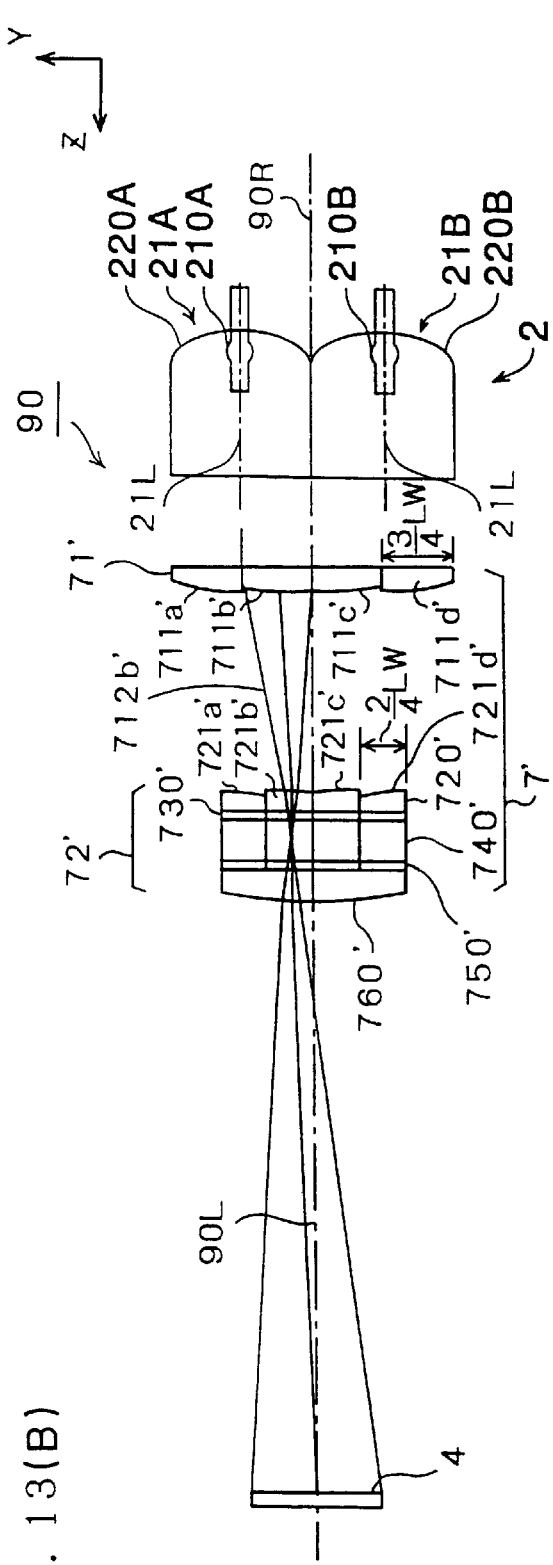
Fig. 13(A)
Fig. 13(B)

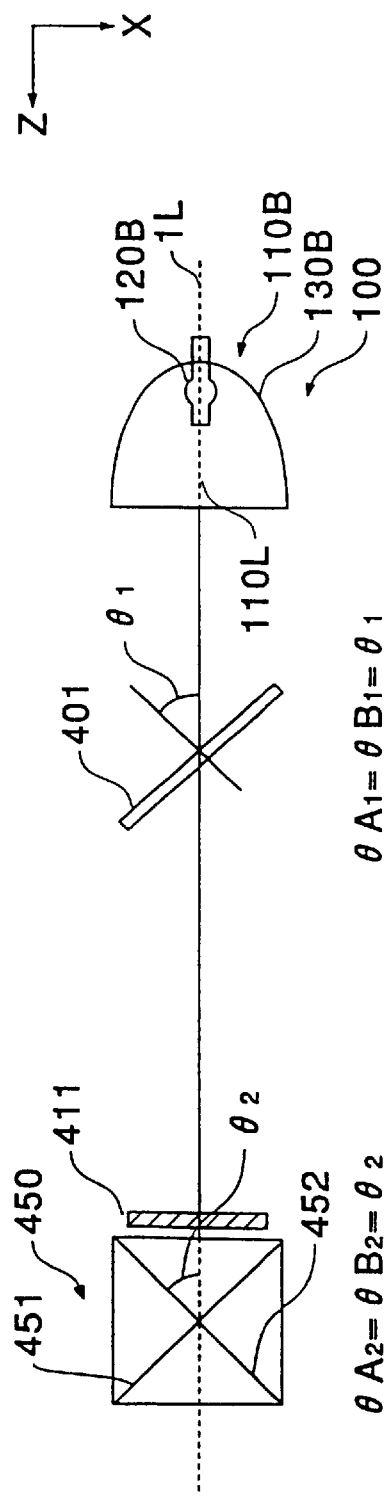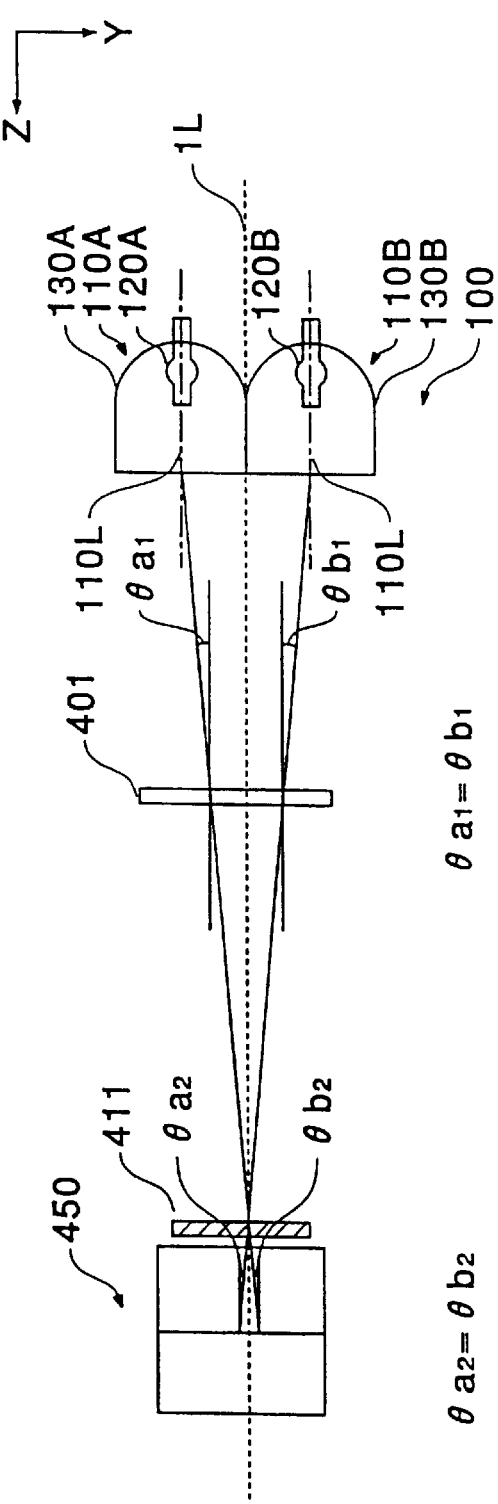
Fig. 20(A)
Fig. 20(B)

LIGHTING DEVICE AND PROJECTOR

This application is a continuation of Ser. No. 09/051,916, filed on Apr. 27, 1998, which is a national stage application filed under 35 U.S.C. §371 based on International Application No. PCT/JP97/02953, filed on Aug. 25, 1997.

BACKGROUND OF THE INVENTION

1. Field of the Invention

The present invention relates to a compact, small-sized lighting device including at least two lamp units and having a high utilization efficiency of light. The present invention also pertains to a projector-type display apparatus with such a lighting device for producing bright projected images which are uniform in brightness.

2. Discussion of the Background

A lighting device incorporated in projector-type display apparatus generally has a lamp unit, which includes a light source lamp, such as a halogen lamp or a metal halide lamp, and a reflector for reflecting an incident ray emitted from the light source lamp and outputting the reflected ray as a parallel beam or a converging beam in a predetermined direction. Available reflectors have the reflecting surfaces in the shape of paraboloid or ellipsoid.

It is preferable that the lighting device used in the projector-type display apparatus has a large output quantity of light, in order to produce uniform and bright projected images. Further a compact, small-sized lighting device is desirable when being incorporated in portable projector-type display apparatus.

The lighting device may include a plurality of lamp units, for example, two lamp units, in order to increase the output quantity of light. A simple array of the two lamp units in parallel, however, doubles the width of the lighting device and makes the lighting device undesirably bulky. This arrangement also doubles the width of the flux of output light and requires an extended width of the optical path in the lighting device. This further doubles the required width of the optical path formed in the projector-type display apparatus with such a lighting device incorporated therein. This arrangement is thus not suitable for the requirement of the compact, small-sized structure.

A typical example of the lighting device incorporated in the projector-type display apparatus is a lamp unit including a light source lamp having a short arc length and a reflector of a paraboloidal shape having a short focal distance. The distribution of the quantity of light emitted from the lamp unit of this structure is shown as a characteristic curve that has a sharp peak on and in the vicinity of a lamp optical axis and abruptly decreases with a distance from the lamp optical axis. The use of only the light fluxes in a central portion including the lamp optical axis for illumination does not significantly lower the quantity of light.

SUMMARY OF THE INVENTION

The object of the present invention is thus to provide a technique for providing a lighting device with a plurality of lamp units and a projector-type display apparatus with such a lighting device incorporated therein, which can produce projection images that are bright, uniform in brightness, and even in color.

DESCRIPTION OF THE PREFERRED EMBODIMENTS (First Lighting Device and Projector-type Display Apparatus therewith)

At least part of the above and the other related objects is attained by a first lighting device of the present invention, which includes a lamp unit having a light source lamp and a reflector for reflecting light emitted from the light source lamp, the lighting device further including a plurality of the lamp units arrayed in a direction perpendicular to an optical axis of the light source lamp, wherein the reflector of each the lamp unit has a shape obtained through cutting a concave surface of revolution, which is obtained by rotating a curve about the optical axis of the light source lamp, on at least one end adjoining to another lamp unit by a plane substantially perpendicular to a direction of the array of the lamp units.

The plurality of lamp units may be arrayed in one direction substantially perpendicular to the optical axis of the light source lamp, or in two directions each substantially perpendicular to the optical axis of the light source lamp.

In a lamp unit with a reflector, the quantity of output light is extremely large in a central portion including an optical axis of a light source lamp and decreases with a distance from the optical axis of the light source lamp. In the first lighting device of the present invention, the reflector of each lamp unit is cut to have a narrow width. This reduces the total width of the lighting device. This structure with narrow reflectors effectively utilizes the output light in the central portion including the lamp optical axis and thereby ensures a sufficient amount of output light. The lighting device of the present invention ensures a greater quantity of output light, while having substantially the same size as that of the conventional lighting device with only one lamp unit. The lighting device of the present invention is preferably used as a light source of a projector-type display apparatus that displays bright projection images.

In accordance with one preferable application, the reflector has a shape obtained through both ends of the concave surface of revolution by the plane substantially perpendicular to the direction of the array of the lamp units, and a distance between both of cut faces is approximately half a diameter of an opening of the concave surface of revolution. Especially two lamp units arrayed in one direction have the quantity of output light as much as about 1.5 times the conventional lighting device with a single lamp unit, while making the width of the lighting device substantially the same. This arrangement enables the projector-type display apparatus to utilize an optical system designed for a lamp unit having a reflector with no side cuts.

In accordance with another preferable application, the reflectors included in the plurality of lamp units are optically integrated with one another. This facilitates the manufacture of the lighting device. The term 'optically integrated' means that the respective optical elements are in close contact with one another. The plurality of optical elements may be optically integrated by bonding them with an adhesive or by integrally forming them.

One preferable structure enables one of the light source lamps included in the plurality of lamp units to be selectively turned on. This structure enables the brightness of light to be adjusted in multiple steps if required, thereby attaining the required brightness and efficient power consumption.

In accordance with another preferable structure, the light source lamps included in the plurality of lamp units emit respective light of different wavelength distribution characteristics. This structure enables the tint of light for illumination to be set to a predetermined value, thereby improving the color reproducibility of a color projector-type display apparatus.

The lighting device preferably has an integrator optical system, in order to reduce the unevenness of illuminance of light output from the lighting device. Namely the lighting device further includes an integrator optical system having a first lens plate including a plurality of lenses and a second lens plate including a plurality of lenses, wherein the first lens plate spatially divides the light emitted from the light source lamp by the plurality of lenses included therein to produce a plurality of intermediate light fluxes, which are focused as secondary light source images in the vicinity of entrance planes of the plurality of lenses included in the second lens plate, output via the plurality of lenses included in the second lens plate, and superposed on a predetermined illumination area. Even when there is a significant variation of the intensity of light within a cross section of the light flux emitted from the lamp unit, the above structure enables the output light to be uniform in brightness and even in color.

In one preferable application of this structure, the lighting device further includes polarizing means for converting light fluxes output from the second lens plate to light fluxes of a single polarization type having identical polarizing directions and outputting the light fluxes of the single polarization type. The polarizing means has polarization separating means for separating the light fluxes output from the second lens plate into light fluxes of two polarization types having different polarizing directions; and polarization converting means for converting the polarizing direction of one of the light fluxes of the two polarization types obtained by the polarization separating means to the polarizing direction of the other of the light fluxes of the two polarization types, wherein the predetermined illumination area is illuminated with the polarized light fluxes of the single type having identical polarizing directions obtained by the polarizing means.

Since this structure uses only the light fluxes of a single polarization type having substantially identical polarizing directions for illumination, the utilization efficiency of light is improved when the lighting device is incorporated in, for example, a projector-type display apparatus as discussed below. Light absorption hardly occurs in the process of converting the light fluxes of random polarizing directions to the polarized light fluxes of a single polarization type having substantially identical polarizing directions. This gives specific polarized light fluxes with an extremely high efficiency.

The lighting device discussed above may be used as a light source of a projector-type display apparatus. The projector-type display apparatus includes the first lighting device of the present invention described above, modulation means for modulating light emitted from the lighting device responsive to image information, and a projection optical system for projecting a modulated light flux obtained by the modulation means onto a projection plane. As described above, the first lighting device of the present invention ensures a greater quantity of output light, while having substantially the same size as that of the conventional lighting device. The projector-type display apparatus using the first lighting device as the light source produces projection images of the improved brightness, while having substantially the same size as that of the conventional apparatus with a single lamp unit.

In case that the lighting device has an integrator optical system, even when there is a significant variation of the intensity of light within a cross section of the light flux emitted from the lamp unit, this structure enables the modulation means to be illuminated evenly with the light of uniform brightness. The projector-type display apparatus accordingly produces a projection image that is uniform in brightness and even in color over the whole projection plane.

In accordance with one preferable application, the lighting device includes the polarizing means having the polarization separating means and the polarization converting means as described above. This structure enables the modulation means to be illuminated with light fluxes of a single polarization type having identical polarizing directions.

In the projector-type display apparatus with the modulation means utilizing light fluxes of a single polarization type, such as a liquid-crystal device, when the output light includes the light fluxes of random polarizing directions, polarization selecting means, such as a polarizing plate, is required to omit the polarized light fluxes of a different polarizing direction that is not used for the illumination. This extremely lowers the utilization efficiency of light. When the polarizing plate is used as the polarization selecting means, a powerful cooling device is required for cooling the polarizing plate, since absorption of light significantly increases the temperature of the polarizing plate. The above preferable structure, however, converts the light fluxes of random polarizing directions emitted from the light device to polarized light fluxes of a single polarization type having substantially identical polarizing directions and enables the modulation means to be illuminated with the light fluxes of a single polarization type having substantially identical polarizing directions. Namely this structure utilizes most of the light fluxes emitted from the light source lamps and produces extremely bright projection images. The light used for illumination and display includes little polarized light fluxes of a different polarizing direction, so that the amount of light absorbed by the polarizing plate is extremely small. This effectively prevents the temperature increase of the polarizing plate and remarkably reduces the size of the cooling device for cooling the polarizing plate.

In order to project and display color images, the projector-type display apparatus further includes color separation means for separating the light emitted from the lighting device into at least two color light fluxes; a plurality of the modulation means for modulating the respective color light fluxes separated by the color separation means; and color combining means for combining the color light fluxes modulated by the plurality of modulation means, wherein a composite light flux obtained by the color combining means is projected on the projection plane via the projection optical system.

(Second Lighting Device and Projector-type Display Apparatus therewith)

The present invention is also directed to a second lighting device for illuminating an illumination area of a substantially rectangular shape having sides parallel to either of a first direction and a second direction which are substantially perpendicular to each other. The second lighting device includes: a light source; a first lens plate having a plurality of small lenses for dividing a light flux emitted from the light source into a plurality of partial light fluxes and condensing the plurality of partial light fluxes; a second lens plate having a plurality of small lenses on which the plurality of partial light fluxes are incident; polarizing means comprising polarization separating means for separating each of the plurality of partial light fluxes output from the second lens plate into light fluxes of two polarization types having different polarizing directions, and polarization converting means for converting the polarizing direction of one of the light fluxes of the two polarization types obtained by the polarization separating means to the polarizing direction of the other of the light fluxes of the two polarization types, the polarizing means thereby converting the plurality of partial light fluxes to plural light fluxes of a single polarization type having substantially identical polarizing directions and outputting the plural light fluxes of the single polarization type; and superposing means for superposing the plural polarized light fluxes output from the polarizing means to illuminate the illumination area. The polarization separating means is arranged to cause the light fluxes of two polarization types to be spatially separated along the first direction of the illumination area. Each small lens of the first lens plate has a substantially rectangular shape when projected on a plane perpendicular to a central optical axis of the each small lens, wherein the substantially rectangular shape has an aspect ratio that is virtually equal to an aspect ratio of the illumination area, and the plurality of partial light fluxes output from the small lenses are incident on corresponding small lenses of the second lens plate. Each small lens of the second lens plate has a substantially rectangular shape when projected on a plane perpendicular to a central optical axis of the each small lens, wherein the substantially rectangular shape has an aspect ratio that is smaller than the aspect ratio of the illumination area. The aspect ratio is defined by a ratio of a length of the side parallel to the second direction to a length of the side parallel to the first direction.

Here the light flux passing through each small lens of the second lens plate is regarded as a set of illumination light flux. The attention is drawn to the aspect ratio of the cross section of the illumination light flux. In the second lighting device of the present invention, the second lens plate includes the small lenses having the aspect ratio that is smaller than the aspect ratio of the small lenses of the first lens plate (which is virtually identical with the aspect ratio of the illumination area). The aspect ratio of the set of illumination light flux is accordingly smaller than the aspect ratio of another set of illumination light flux which would be obtained when the second lens plate had a plurality of small lenses having the aspect ratio that is identical with the aspect ratio of the small lenses of the first lens plate. The cross section of the illumination light flux is accordingly rectangular, wherein the length of the first direction is greater than the length of the second direction, corresponding to the aspect ratio of the small lenses of the second lens plate. (Among the sets of illumination light fluxes passing through the second lens plate, the illumination light flux having the aspect ratio of its cross section corresponding to the aspect ratio of the small lenses of the second lens plate is hereinafter referred to as the 'compressed illumination light flux', whereas the illumination light flux having the aspect ratio of its cross section corresponding to the aspect ratio of the small lenses of the first lens plate is hereinafter referred to as the 'non-compressed illumination light flux'.)

When the lighting device of this structure is applied to a projector-type display apparatus, a projection plane is illuminated with the compressed illumination light fluxes via a projection lens. Compared with the non-compressed illumination light flux, the compressed illumination light flux has a smaller incident angle, at which the light flux enters the projection lens, and enables a greater amount of illumination light fluxes to enter on and in the vicinity of the center of the lens pupil of the projection lens. The utilization efficiency of light in a lens is generally higher at the position nearer to the center of the lens pupil and worsens toward the periphery. Application of the second lighting device of the present invention to the projector-type display apparatus enables the light emitted from the light source to be utilized efficiently and displays uniform and bright projection images.

The plurality of small lenses of the second lens plate, which have the smaller aspect ratio than that of the small lenses of the first lens plate, are arranged to have substantially the same dimensions as those of a shape when projected on a plane perpendicular to the central optical axis of the second lens plate, which includes a plurality of small lenses having the same aspect ratio as that of the small lenses of the first lens plate. The number of the small lenses of the second lens plate is identical with the number of the small lenses of the first lens plate. The reflector of the lamp unit is increased in size corresponding to the dimensions of a shape when projected on a plane perpendicular to the central optical axis of the first lens plate. This increases the utilization efficiency of the light fluxes emitted from the light source lamp, without increasing the sectional dimensions of the optical system except the reflector, compared with the conventional lighting device with the second lens plate which includes small lenses having the same aspect ratio as that of the small lenses of the first lens plate.

In order to obtain the equivalent quantity of the compressed illumination light fluxes to that of the non-compressed illumination light fluxes, the optical elements in each optical system, which the light output from the second lens plate passes through, have smaller required dimensions along the second direction. This desirably reduces the size of the lighting device as well as the size of the projector-type display apparatus with such a lighting device incorporated therein.

In accordance with one preferable application, the light source includes a plurality of lamp units arrayed in the second direction, each the lamp unit having a light source lamp and a reflector for reflecting light emitted from the light source lamp. Although requiring the additional space for the plurality of lamp units, the lighting device of this structure increases the quantity of output light.

When this lighting device is applied to the projector-type display apparatus, the rays emitted from the plurality of lamp units are deviated in a substantially symmetrical manner along the second direction with respect to the central optical axis of the second lens plate, when passing through the projection lens. As described above, the utilization efficiency of light in a lens is generally higher at the position nearer to the center of the lens pupil and worsens toward the periphery. As described in the prior art, the quantity of light output from one lamp unit is extremely large in a central portion including an optical axis of a light source lamp and abruptly decreases with a distance apart from the optical axis of the light source lamp. In the lighting device of the above structure, the width of the light output from each lamp unit along the second direction is compressed about the central optical axis of the second lens plate. This enables the rays emitted from the plurality of lamp units to be led to the projection lens with a high efficiency and realizes bright projection images.

The second lighting device of the present invention has the integrator optical system including the first lens plate, the second lens plate, and the superposing means, thereby effectively reducing the unevenness of illuminance of light. The second lighting device also has the polarizing means that generates light fluxes of s single polarization type having substantially identical polarizing directions as the light of illumination. This structure utilizes most of the light fluxes emitted from the light source lamp and thereby improves the utilization efficiency of light.

The plurality of partial light fluxes output from the first lens plate are focused in the vicinity of the second lens plate and the polarization separating means to form secondary light source images. The polarization separating means divides each incident light flux along the first direction into two types of polarized light fluxes, so that two secondary light source images are formed in alignment along the first direction on the polarization separating means. It is accordingly desirable that the dimensions of the polarization separating means are substantially identical with or greater than the dimensions of the two secondary light source images aligned along the first direction. When the dimension along the first direction of each small lens included in the second lens plate is substantially the same as the dimension along the first direction of the polarization separating means, the respective smalls lenses of the second lens plate and the polarization separating means can be arranged at the highest efficiency without any clearances. The value of the aspect ratio of each small lens of the second lens plate may be set equal to approximately ½ by taking into account the efficiency of arrangement of the respective small lenses of the second lens plate and the polarization separating means, when the secondary light source images are approximated to have a substantially circular shape. This arrangement reduces the size of the second lens plate without causing a light loss. This structure enables the light emitted from the light source to be efficiently utilized and obtains a large quantity of light for illumination.

In the lamp unit generally applied, the rays emitted from the light source lamp are reflected by the reflector and output as parallel rays. The parallelism of the output light from the lamp unit is worse at the position closer to the lamp optical axis and improved with a distance from the lamp optical axis. The secondary light source images formed by the plurality of partial light fluxes in the vicinity of the second lens plate and the polarization separating means are smaller at the position farther from the center of the second lens plate. It is accordingly preferable that the plurality of small lenses of the second lens plate arranged in a plurality of rows along the second direction are adjusted to have the dimension along the second direction that decreases with their distances from the center position of the light flux emitted from the light source.

This structure more efficiently decreases the width along the second direction of the set of illumination light flux passing through the second lens plate. This accordingly reduces the sizes of the second lens plate and the polarizing means and improves the utilization efficiency of light output from the light source.

In the lighting device with the array of the plurality of lamp units, the reflector of each the lamp unit may have a shape obtained through cutting a concave surface of revolution, which is obtained by rotating a curve about the optical axis of the light source lamp, on at least one end adjoining to another lamp unit by a plane substantially perpendicular to a direction of the array of the lamp units.

In a lamp unit with a reflector, the quantity of output light is extremely large in a central portion including an optical axis of a light source lamp and decreases with a distance from the optical axis of the light source lamp. In the lighting device of the above structure, the reflector of each lamp unit is cut to have a narrow width. This reduces the total width of the lighting device. This structure with narrow reflectors effectively utilizes the output light in the central portion including the lamp optical axis and thereby ensures a sufficient amount of output light. The lighting device of the present invention ensures a greater quantity of output light, while having substantially the same size as that of the conventional lighting device with only one lamp unit. The lighting device of the present invention is preferably used as a light source of a projector-type display apparatus that displays bright projection images.

The lighting device discussed above may be used as a light source of a projector-type display apparatus. The projector-type display apparatus includes the second lighting device of the present invention discussed above, modulation means for modulating light emitted from the lighting device responsive to image information, and a projection optical system for projecting a modulated light flux obtained by the modulation means onto a projection plane. As described above, the second lighting device of the present invention efficiently utilizes the light emitted from the light source and obtains a large quantity of light for illumination. The projector-type display apparatus using the second lighting device as the light source produces projection images of the improved brightness, while having substantially the same size as that of the conventional apparatus with a single lamp unit.

The second lighting device of the present invention has the integrator optical system as discussed above. Even when there is a significant variation of the intensity of light within a cross section of the light flux emitted from the lamp unit, this structure enables the modulation means to be illuminated evenly with the light of uniform brightness. The projector-type display apparatus accordingly produces a projection image that is uniform in brightness and even in color over the whole projection plane.

The second lighting device of the present invention has the polarizing means including the polarization separating means and the polarization converting means and enables the modulation means to be illuminated with light fluxes of a single polarization type having substantially identical polarizing directions. In the projector-type display apparatus with the modulation means utilizing light fluxes of a single polarization type, such as a liquid-crystal device, this structure utilizes most of the light fluxes emitted from the light source lamps and produces extremely bright projection images. The light used for illumination and display includes little polarized light fluxes of a different polarizing direction, so that the amount of light absorbed by the polarizing plate is extremely small. This effectively prevents the temperature increase of the polarizing plate and remarkably reduces the size of the cooling device for cooling the polarizing plate.

In order to project and display color images, the projector-type display apparatus further includes color separation means for separating the light emitted from the lighting device into at least two color light fluxes; a plurality of the modulation means for modulating the respective color light fluxes separated by the color separation means; and color combining means for combining the color light fluxes modulated by the plurality of modulation means, wherein a composite light flux obtained by the color combining means is projected on the projection plane via the projection optical system.

(Third and Fourth Projector-type Display Apparatuses)

The present invention is also directed to a third projector-type display apparatus including: a lighting device having a plurality of lamp units, each the lamp unit including a light source lamp and a reflector for reflecting light emitted from the light source lamp; color separation means for separating light emitted from the lighting device into at least two color light fluxes; and a plurality of modulation means for modulating the respective color light fluxes separated by the color separation means. The third projector-type display apparatus further includes: color combining means for combining the color light fluxes modulated by the plurality of modulation means; and a projection optical system for projecting a composite light flux obtained by the color combining means onto a projection plane. When x, y, and z denote three directional axes perpendicular to one another and z represents a direction parallel to an optical axis of light emitted from the lamp unit, the color separation means has a color separation plane that is substantially perpendicular to an x-z plane and has predetermined angles with respect to a y-z plane and an x-y plane, and the plurality of lamp units are arrayed substantially along the y direction.

The third projector-type display apparatus of the present invention thus constructed requires the additional space for the plurality of lamp units, but effectively enhances the quantity of light emitted from the lighting device. Each lamp unit is arranged in a direction perpendicular to the light-dividing direction of a dichroic surface of the color separation means, so that the rays emitted from the respective lamp units enter the dichroic surface at an identical incident angle. This structure effectively reduces color shift of each color light flux output from the dichroic surface to the modulation means. This accordingly enables an illumination area to be illuminated evenly with the light of uniform brightness.

The present invention is further directed to a fourth projector-type display apparatus including: a lighting device having a plurality of lamp units, each the lamp unit including a light source lamp and a reflector for reflecting light emitted from the light source lamp; color separation means for separating light emitted from the lighting device into at least two color light fluxes; and a plurality of modulation means for modulating the respective color light fluxes separated by the color separation means. The fourth projector-type display apparatus further includes: color combining means for combining the color light fluxes modulated by the plurality of modulation means; and a projection optical system for projecting a composite light flux obtained by the color combining means onto a projection plane. When x, y, and z denote three directional axes perpendicular to one another and z represents a direction parallel to an optical axis of light emitted from the lamp unit, the color combining means has a dichroic surface that is arranged to be substantially perpendicular to an x-z plane and have predetermined angles with respect to a y-z plane and an x-y plane, and the plurality of lamp units are arrayed substantially along the y direction.

Like the third projector-type display apparatus, the fourth projector-type display apparatus of the present invention thus constructed requires the additional space for the plurality of lamp units, but effectively enhances the quantity of light emitted from the lighting device. Each lamp unit is arranged in a direction perpendicular to the light-dividing direction of the dichroic surface of the color combining means, so that the rays emitted from the respective lamp units enter the dichroic surface at an identical incident angle. This structure effectively reduces color shift of the composite light flux output from the dichroic surface to the projection optical system. This accordingly produces a projection image of uniform brightness and even color.

In the third and the fourth projector-type display apparatuses of the present invention, the reflector of each the lamp unit may have a shape obtained through cutting a concave surface of revolution, which is obtained by rotating a curve about the optical axis of the light source lamp, on at least one end adjoining to another lamp unit by a plane substantially perpendicular to a direction of the array of the lamp units. The reflectors of this arrangement decrease the area occupied by the lamp units and thereby reduce the size of the projector-type display apparatus. These reflectors enable the rays in central portions including lamp optical axes to be effectively utilized and ensure the sufficient quantity of output light. This accordingly enables uniform and bright projection images to be projected and displayed.

In order to eliminate the unevenness of illuminance of light in the third and the fourth projector-type display apparatuses of the present invention, it is desirable that the lighting device has an integrator optical system. In a preferable structure, the lighting device has an integrator optical system including a first lens plate with a plurality of lenses and a second lens plate with a plurality of lenses. Even when there is a significant variation of the intensity of light within a cross section of the light flux emitted from the lamp unit, this structure gives the light of uniform brightness and even color. The projector-type display apparatus accordingly produces a projection image that is uniform in brightness and even in color over the whole projection plane.

In accordance with one preferable application, the lighting device has polarizing means for converting light fluxes output from the second lens plate to light fluxes of a single polarization type having identical polarizing directions. The illumination area is then illuminated with light fluxes of the single polarization type having identical polarizing directions, which are obtained by the polarizing means. This structure utilizes most of the light fluxes emitted from the light source lamps and produces extremely bright projection images. The light used for illumination and display includes little polarized light fluxes of a different polarizing direction, so that the amount of light absorbed by the polarizing plate is extremely small. This effectively prevents the temperature increase of the polarizing plate and remarkably reduces the size of the cooling device for cooling the polarizing plate.

BRIEF DESCRIPTION OF THE DRAWINGS

FIG. 6 shows wavelength distribution characteristics of light emitted from the lighting device of FIG. 1;

FIG. 7 shows available lighting modes in the lighting device of FIG. 1;

FIG. 13 schematically illustrates an optical system of a lighting device as a fourth embodiment according to the present invention;

FIG. 20 shows the positional relationship between dichroic mirrors and lamp units arrayed in the y-axis direction;

BEST MODES FOR CARRYING OUT THE INVENTION

Preferred embodiments of the present invention are discussed below with reference to the drawings. In the following description of the embodiments, for the matter of convenience, three directions perpendicular to one another are defined as an x-axis direction (lateral direction), a y-axis direction (vertical direction), and a z-axis direction (direction parallel to the optical axis), unless otherwise specified.

(First Embodiment)

Figure 1:
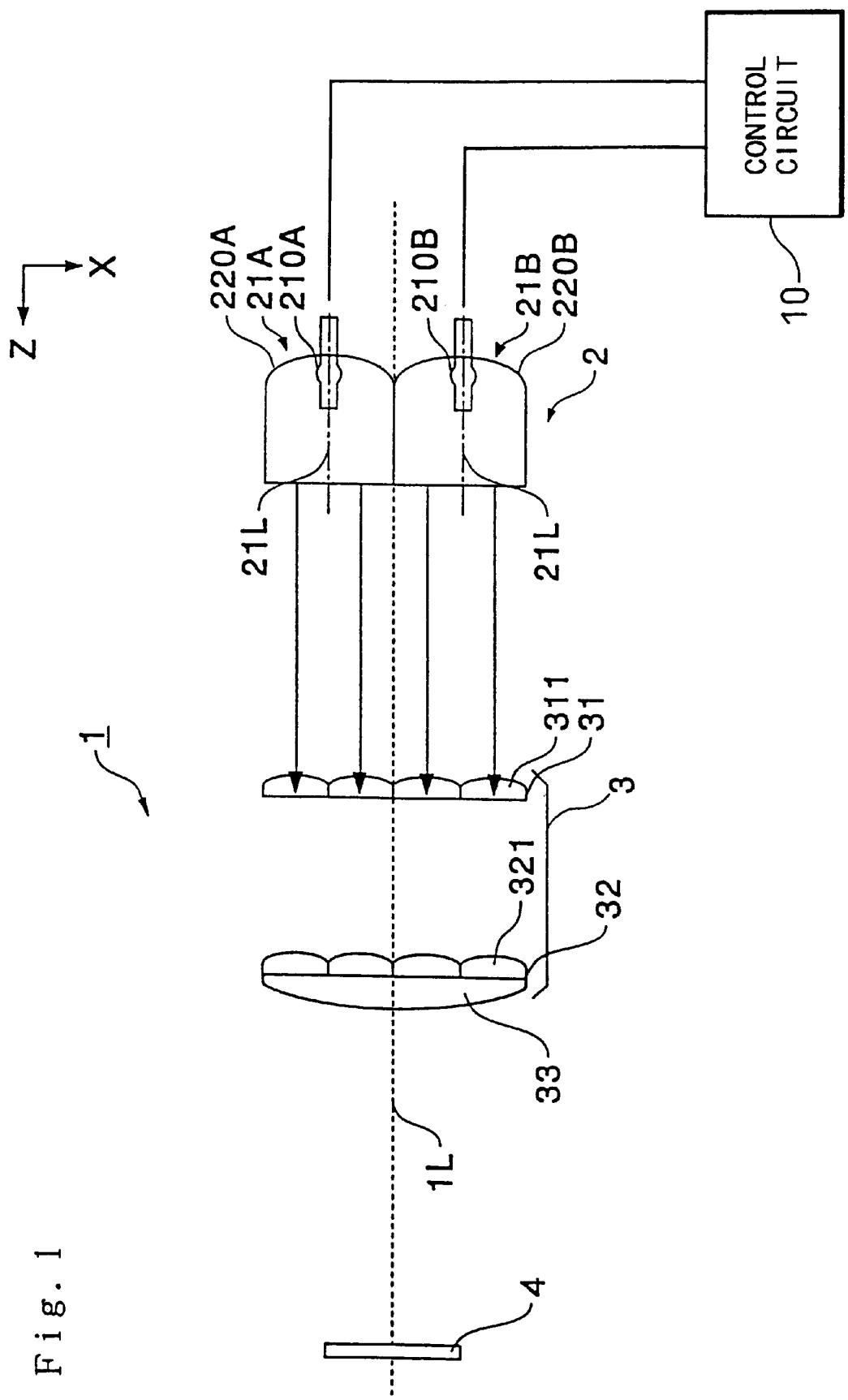
FIG. 1 schematically illustrates an optical system of a lighting device as a first embodiment according to the present invention.

FIG. 1 schematically illustrates an essential part of a lighting device embodying the present invention. A lighting device 1 of the embodiment basically includes a light source unit 2 and an integrator optical system 3, which are arranged along a system optical axis 1L (the z-axis direction). A light beam emitted from the light source unit 2 passes through the integrator optical system 3 and reaches an illumination area 4 as a uniform ray of even illuminance. The integrator optical system 3 includes a first lens plate 31, a second lens plate 32, and a field lens (superposing lens) 33.

The light source unit 2 has a first lamp unit 21A and a second lamp unit 21B having an identical structure and identical dimensions. These lamp units 21A and 21B are arranged to have lamp optical axes 21L in parallel to the system optical axis 1L and to be in parallel in a direction substantially perpendicular to their lamp optical axes 21L, that is, in the x-axis direction.

Figure 2:
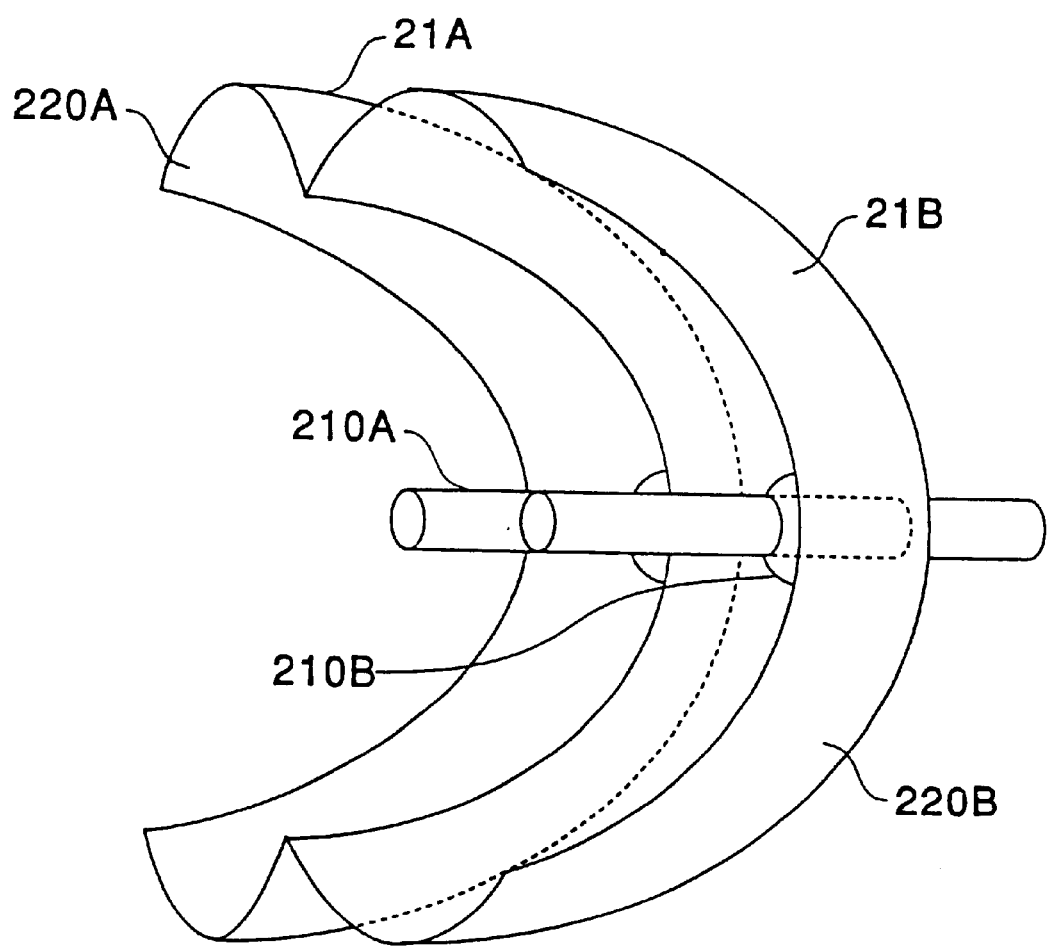
FIG. 2 is a perspective view schematically illustrating a light source unit included in the lighting device of FIG. 1.
Figure 3:
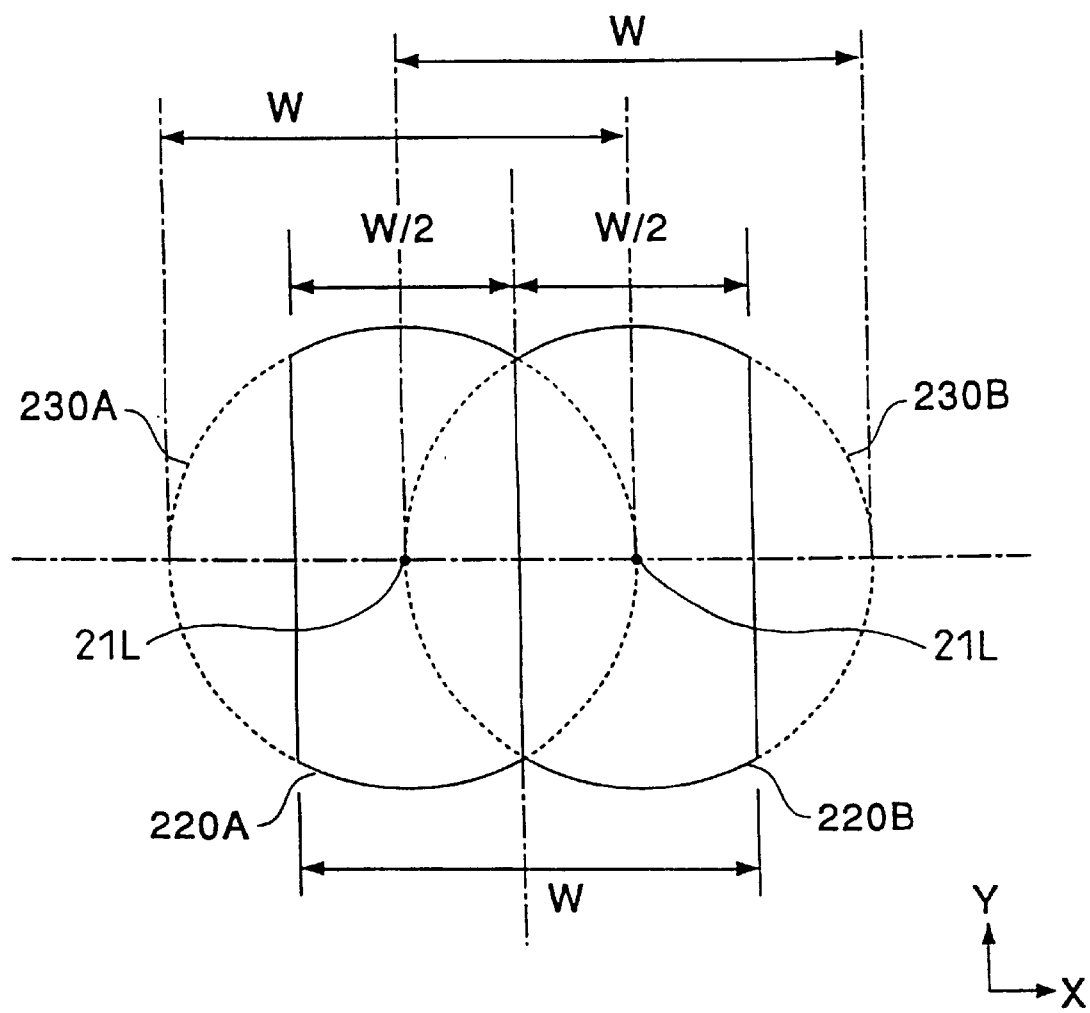
FIG. 3 shows a contour of the light source unit of FIG. 1 seen from the direction of lamp optical axes.

FIG. 2 is a perspective view illustrating the pair of lamp units 21 included in the light source unit 2. The lamp units 21A and 21B respectively have light source lamps 210A and 210B and reflectors 220A and 220B, for example, in the shape of paraboloid. FIG. 3 illustrates a contour of the reflectors 220 when the pair of lamp units 21A and 21B are seen from the side of the integrator optical system 3. Each reflector 220A or 220B is a concave body of a paraboloidal shape with both sides cut off, which is symmetrical about the lamp optical axis 21L. Namely each reflector 220A or 220B having a width of ½ W is obtained by cutting off both side portions of a concave body 230A or 230B, which has a circumferential opening as shown by the broken line, substantially along the y axis by a width of approximately one quarter a diameter W. The lamp units 21A and 21B including the reflectors 220A and 220B with the both sides cut off (hereinafter may be referred to as side-cut lamp units) are arranged in parallel in the direction perpendicular to the lamp optical axes 21L (that is, in the x-axis direction) and connected to each other. The total width of these lamp units 21A and 21B (the width in the x-axis direction) is equal to the width W of one reflector with no side cuts.

Figure 4:
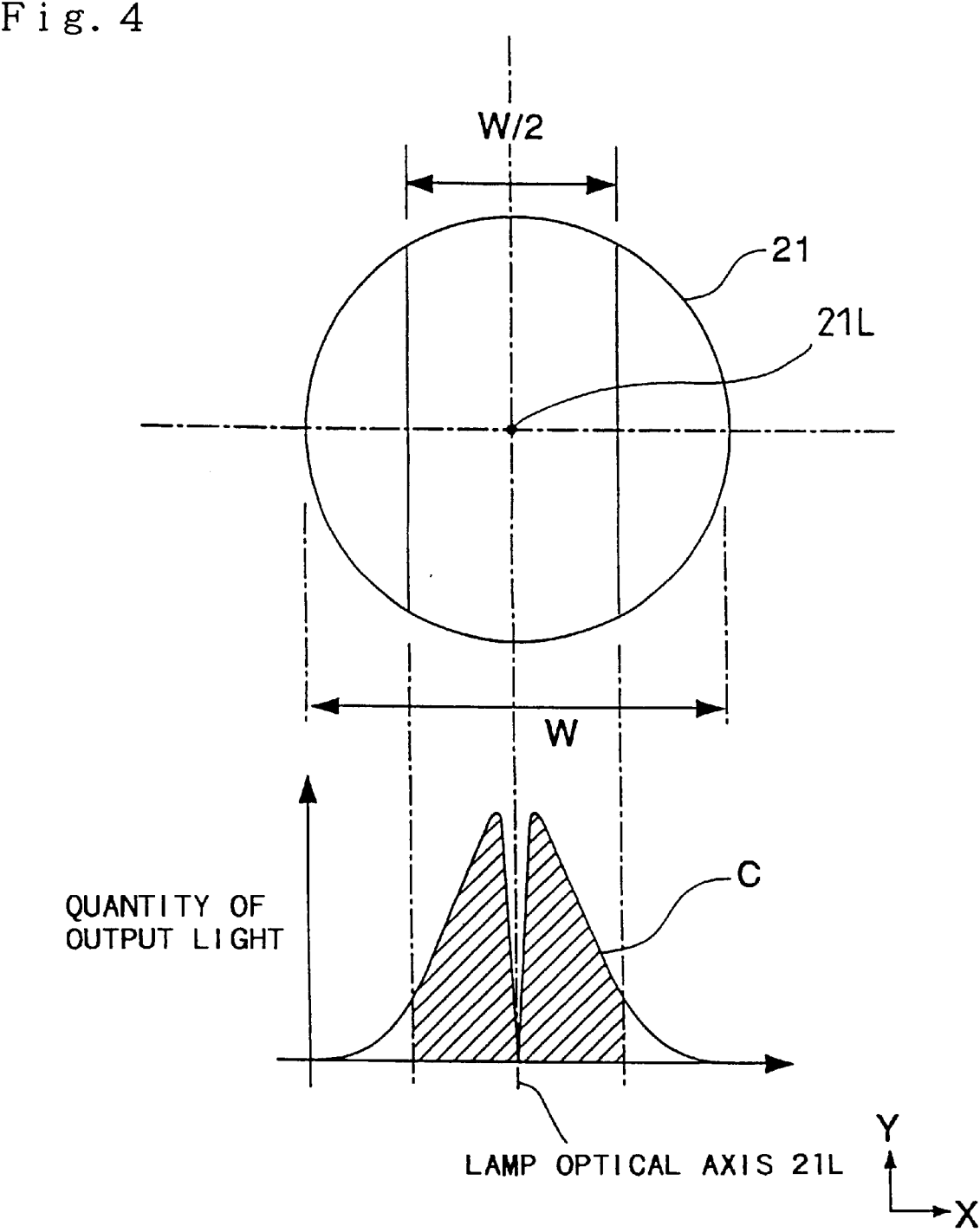
FIG. 4 shows a distribution of the quantity of light output from each lamp unit of the light source unit of FIG. 1 in the direction perpendicular to the lamp optical axis.

FIG. 4 shows a quantity-of-light distribution curve C in the direction perpendicular to the lamp optical axis 21L in the lamp unit 21 with the paraboloidal reflector. As understood from this graph, the quantity of output light is extremely large in a central portion including the lamp optical axis 21L and abruptly decreases with an increase in distance from the lamp optical axis 21L. Like the lamp units 21A and 21B of the embodiment, the reflector 220A or 220B obtained by cutting off both side portions by the total width of approximately ½ W can utilize most of the quantity of the output light. The lighting device 1 of the embodiment accordingly increases the brightness of the illumination area to or above approximately 1.5 times the brightness of the conventional structure with a single lamp unit.

Figure 5:
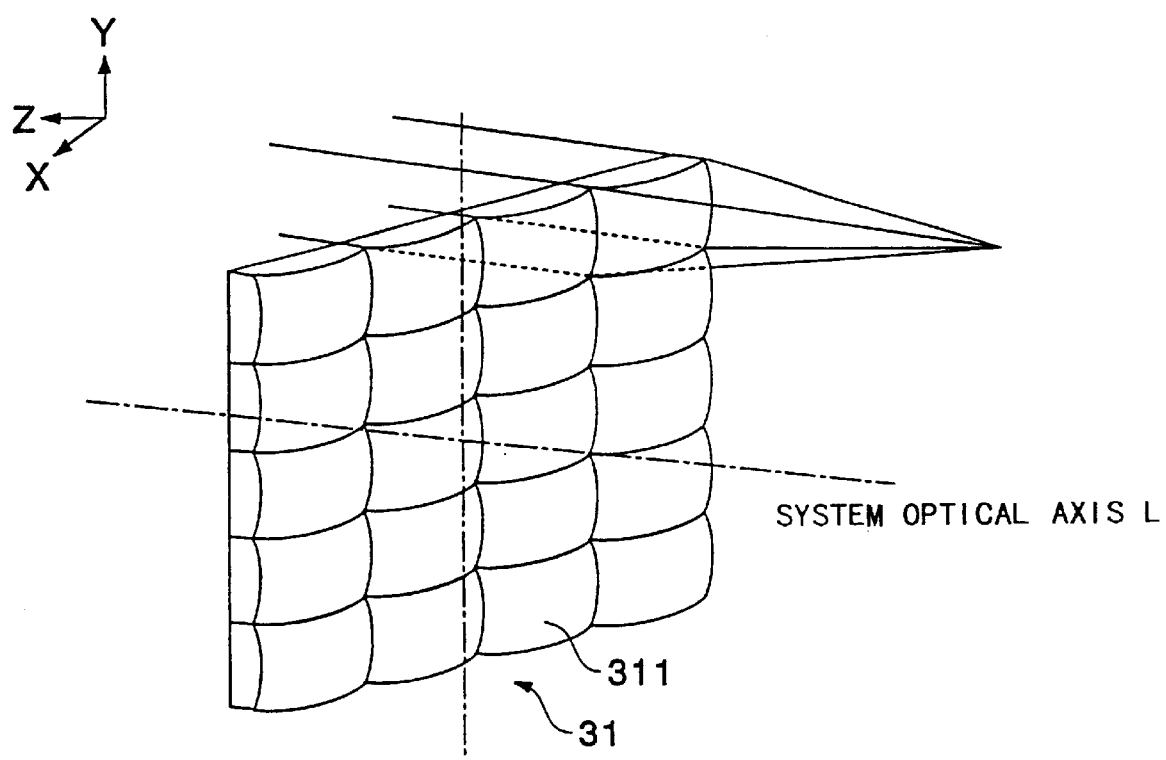
FIG. 5 is a perspective view schematically illustrating structure of a first lens plate included in the integrator optical system of FIG. 1.

Referring back to FIG. 1, the light beam output from the light source unit 2 enters the first lens plate 31 of the integrator optical system 3. FIG. 5 illustrates the first lens plate 31. As shown in FIG. 5, the first lens plate 31 includes a plurality of small rectangular lenses (lenses having a rectangular outer shape in an x-y plane) 311 arranged in a matrix. The outer shape of the rectangular lenses 311 on the x-y plane is set similar to the shape of the illumination area 4. The second lens plate 32 shown in FIG. 1 consists of the same number of small lenses 321 as that of the rectangular lenses constituting the first lens plate 31.

The light beam entering the first lens plate 31 is spatially divided by the respective rectangular lenses 311 to form secondary light-source images inside the respective rectangular lenses 321 of the second lens plate 32. Namely the focal position of each rectangular lens 311 is inside and near to the corresponding rectangular lens 321.

The plurality of secondary light-source images formed on the second lens plate 32 are superposed one upon another and focused on the illumination area 4 via the field lens 33 attached to the output side of the second lens plate 32, so as to illuminate the illumination area 4 substantially uniformly. In principle, all the flux of output light from the light source unit 2 thus enters the illumination area 4. The structure may not require the field lens 33 when the small lenses 321 constituting the second lens plate 32 are decentered lenses having the function of superposing the rays on the illumination area.

As discussed above, the lighting device 1 of the embodiment includes the light source unit 2 of the structure in which the lamp units 21A and 21B having the paraboloidal reflectors with both sides cut off are arranged in parallel. The width of the lighting device 1 is accordingly identical with the width of the conventional lighting device having a single lamp unit. The lighting device 1 utilizes the output light in a central portion including the lamp optical axes, which occupies most of the quantity of output light of the lamp units 21A and 21B. Although both sides of the reflectors are cut off, the lighting device 1 secures about 1.5 times as much quantity of light as a conventional device with a single lamp unit. Compared with a lamp unit without any side cuts, the lamp units 21A and 21B having the side-cut reflectors have better cooling efficiency and less temperature increase.

As described before, a light source lamp of a short arc length used as the lamp unit improves the parallelism of the output rays, but causes a distribution of the quantity of output light which is extremely large in the portion of the lamp optical axis and abruptly decreases towards the peripheral portion. When the light beam emitted from such a lamp unit enters the lens plate included in the integrator optical system, uneven brightness is prominent; that is, the peripheral area is remarkably darker than the central area of the lens plate. In case that the size of one small lens (rectangular lens) is larger, uneven brightness would be also prominent in the flux of light passing through the respective small lenses of the first lens plate 31. In order to obtain the rays of uniform brightness, it is required to increase the number of lens divisions of the lens plate and reduce the size of each small lens. The lighting device 1 of the embodiment including the light source unit and the integrator optical system, on the other hand, utilizes the output rays having the large quantity of light in the central portions of the two side-cut lamp units. This structure reduces the difference in brightness between the central area and the peripheral area. The structure of the embodiment accordingly enables the illumination area to be illuminated evenly with uniform brightness, without increasing the number of lens divisions of the lens plate included in the integrator optical system.

In the embodiment, the width of each lamp unit is approximately ½ W. The width is, however, not restricted to ½W but may be, for example, $7/10$W through $3/10$ W. The width of each lamp unit, or the cut-off width of each reflector, should be set appropriately according to the distribution of the quantity of light output from the lamp units applied.

The pair of lamp units may have different widths, and the cut-off widths on both sides of the reflector may be different in each lamp unit. Especially when the integrator optical system is provided like this embodiment, combination of the lamp units having different widths more effectively reduces the unevenness of illuminance on the illumination area. In the structure of the embodiment, the light source unit including the pair of lamp units having an identical width is arranged to have its center coinciding with the system optical axis. In the combination of lamp units having different widths, however, the system optical axis is deviated from the center of the lamp optical axis of each lamp unit. This structure of the lamp units causing an unsymmetrical distribution of intensity of light output from the light source unit with respect to the system optical axis effectively reduces the unevenness of illuminance on the illumination area. This modified structure does not require the center of the light source unit to coincide with the system optical axis and thereby increases the degree of freedom in the layout of the constituents.

In this embodiment, both side portions of each reflector in the x-axis direction are cut off to narrow the width and the lamp units are arranged in the x-axis direction. In another preferable structure, both side portions of each reflector in the y-axis direction may be cut off to narrow the width and the lamp units are arranged in the y-axis direction.

Although the pair of lamp units are arranged in parallel in the embodiment, three or more lamp units may be arranged in parallel or in series. For example, four lamp units having narrow reflectors with side portions cut off in both the x-axis direction and in the y-axis direction may be arranged in a 2×2 matrix to construct a light source unit. This modified structure has substantially the same size as a conventional device with a single lamp unit, to provide a remarkably brighter light source.

The light source unit may be constructed to be an array of plural lamp units, each having one reflector and one light source lamp. In another possible structure, a plurality of light source lamps are arrayed in a plurality of reflectors integrally formed in advance. Compared with the former structure, the latter structure is readily manufactured and enables the thickness of the boundary between the adjoining reflectors to be reduced. The latter structure accordingly reduces the manufacturing cost, the size of the light source unit, and the light loss on the boundary between the adjoining reflectors. The section of the reflector may have an ellipsoidal or circular shape other than the paraboloidal shape. In other words, a reflector may have a shape which is prepared by cutting a concave surface of revolution, obtained by rotating a curve (especially a quadric curve) about the optical axis of a light source lamp, on at least one end adjoining to another lamp unit by a plane substantially perpendicular to the direction of the array of the lamp units.

Although the lamp unit of this embodiment includes the same type of light source lamps, it may include light source lamps of different spectra; such a lamp unit can improve color reproducibility of a color projector-type display apparatus. FIG. 6 shows wavelength distribution characteristics of light in the lighting device 1. The wavelength distribution characteristics (spectral characteristics) of the lighting device generally depend upon the type of the light source lamp used therein. For example, some light source lamps give outputs over the whole range of visible rays but have insufficient outputs in the red light range. It is assumed here that the desirable spectroscopic distribution characteristics of the lighting device 1 show substantially equal relative outputs over the wavelength range for respective color rays as shown in FIG. 6(C). The wavelength distribution of the lamp unit 21A (light source lamp 210A) is characterized by low relative outputs in the red light range as shown in FIG. 6(A). In this case, the light source lamp 210B should be selected to enable the wavelength distribution of the lamp unit 21B to have high relative outputs in the red light range as shown in FIG. 6(B). The rays output from the whole lighting device 1 substantially equal to the sum of the outputs of the lamp units 21A and 21B and the desired wavelength distribution characteristics can be obtained as shown in FIG. 6(C). Some combinations of lamp units give rays of strong red tint or those of strong blue tint. Combining the light characteristics of two lamp units results in rays of various characteristics. The wave length distribution shown in FIG. 6 is only an example for illustrating the effects of this embodiment, but light source lamps having a variety of other wavelength distribution characteristics are applicable as well.

Another advantage of the embodiment including two lamp units is to allow continuous operation with lowered illuminance even when one lamp has burnt out during operation.

A control circuit 10 (see FIG. 1) may selectively turn on and off the two light source lamps. This enables the brightness of light to be adjusted in multiple steps according to the requirements, thereby attaining the required brightness and efficient power consumption. FIG. 7 shows available lighting modes of the lighting device 1. As described above, the lighting device 1 includes the two light sources, the lamp units 21A and 21B, so that there are four lighting modes: mode 0 through mode 3 shown in FIG. 7. In the mode 0, both the lamp units 21A and 21B are turned off. In the mode 1, the lamp unit 21A is turned on, while the lamp unit 21B is turned off. In the mode 2, the lamp unit 21A is turned off, while the lamp unit 21B is turned on. In the mode 3, both the lamp units 21A and 21B are turned on. The lighting mode is switched by a non-illustrated switching circuit. Selection of an appropriate mode exerts the effects discussed below.

Selection of the mode 3 enables the illumination area 4 to be illuminated with light output from both the lamp units 21A and 21B, and thus gives light of large intensity. This enhances the intensity of light as well as the utilization efficiency of light without requiring extremely high-output light source lamps for the light source lamps 210A and 210B of the lamp units 21A and 21B.

In the normal operating state, either the mode 1 or the mode 2 is selected, and the illumination area 4 is illuminated with light output from either one of the lamp units 21A and 21B. For example, the mode 1 is selected in the normal operating state to turn only the lamp unit 21A on for illumination of the illumination area 4. When the lamp unit 21A malfunctions or the light source lamp 210A burns out, the mode 2 is selected to turn on the light source lamp 210B of the lamp unit 21B for the continuous operation. This improves the life of the lighting optical system.

Further, the light source lamps 210A and 210B may have different luminance. For example, the light source lamp 210A of the lamp unit 21A is set to have a luminance in the normal operating state, whereas the light source lamp 210B of the lamp unit 21B is set to have a lower luminance. This changes the intensity of light in three different steps. Selection of the mode 1 gives light of a normal intensity. Selection of the mode 3 gives light of a greater intensity, whereas selection of the mode 2 gives light of a smaller intensity.

(Second Embodiment)

Figure 8:
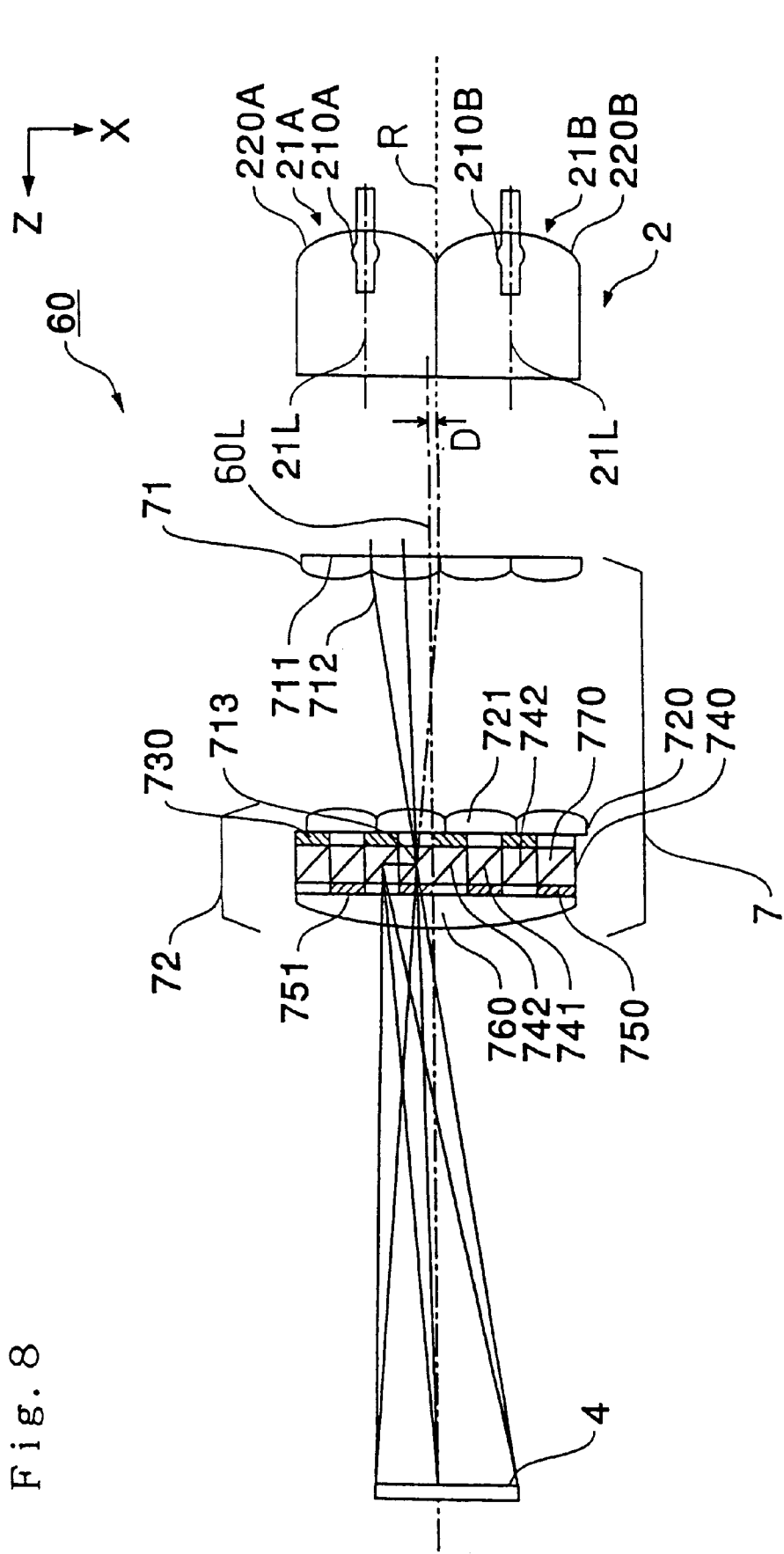
FIG. 8 schematically illustrates an optical system of a lighting device as a second embodiment according to the present invention.

FIG. 8 schematically illustrates an essential part of a polarizing lighting device embodying the present invention. A polarizing lighting device 60 of this embodiment includes a light source unit 2 having an identical structure to that of the light source unit 2 of the lighting device 1 described above. The polarizing lighting device 60 also includes an integrator optical system having two lens plates, that is, a first optical element 71 and a condenser lens array 720. The first optical element 71, the condenser lens array 720, and a superposing lens 760 have substantially the same functions as those of the first lens plate 31, the second lens plate 32, and the filed lens 33 shown in FIG. 1. The difference is that a polarizing optical system is arranged between the condenser lens array 720 and the superposing lens 760 for converting the light output from the light source unit 2 to polarized light having one polarizing direction.

The polarizing lighting device 60 of the embodiment basically includes the light source unit 2 and a polarizing unit 7 having the function of the integrator optical system, which are arranged along a system optical axis 60L. The light flux of random polarizing directions emitted from the light source unit 2 (hereinafter referred to as the light flux of random polarization) is converted by the polarizing unit 7 to a light flux of substantially identical polarizing directions, which then reaches the illumination area 4. The light source unit 2 is arranged in such a manner that an optical axis R of the light emitted from the light source unit 2 is a parallel displacement of the system optical axis 60L in the x-axis direction of by a predetermined distance D.

The polarizing unit 7 includes the first optical element 71 and a second optical element 72. The positional relationship between the light source unit 2 and the first optical element 71 is specified to make the optical axis R of the light source unit 2 coincident with the center of the first optical element 71. The light entering the first optical element 71 is divided by an array of flux division lenses 711 into a plurality of intermediate light fluxes 712, which are focused by the beam-condensing function of the flux division lenses to form the same number of converged images (secondary light-source images) 713 as the number of the flux division lenses in a plane perpendicular to the system optical axis 60L (an x-y plane in FIG. 8). The outer shape of the array of the flux division lenses 711 on the x-y plane is set similar to the shape of the illumination area 4. In this embodiment, there is a wide illumination area wider in the x direction on the x-y plane, so that the flux division lenses 711 have a wide outer shape on the x-y plane.

The second optical element 72 is a complex essentially including the condenser lens array 720, a shielding plate 730, an array of polarization separating units 740, a selective phase difference plate 750, and the superposing lens 760. The second optical element 72 thus constructed is arranged in the plane perpendicular to the system optical axis 60L (the x-y plane) and in the vicinity of the position of the converged images 713 formed by the first optical element 71. The second optical element 72 spatially separates each of the intermediate light fluxes 712 to a p-polarized light flux and an s-polarized light flux, adjusts these fluxes to either one of the polarizing directions, and leads the fluxes of substantially identical polarizing directions to the illumination area 4.

The condenser lens array 720 has the function of condensing and leading the respective intermediate light fluxes to specific positions of the array of polarization separating units 740. It is desirable that the lens characteristics of each condenser lens 721 are optimized by taking into account the fact that it is ideal that the slope of the primary rays entering the array of polarization separating units 740 is parallel to the system optical axis 60L.

In general, however, for the cost reduction of the optical system and the readiness of design, the structure identical with the first optical element 71 may be applied for the condenser lens array 720. In another example, the condenser lens array may consist of condenser lenses having the similar outer shape to that of the flux division lenses 711 in the x-y plane. In this embodiment, the structure identical with the first optical element 71 is applied for the condenser lens array 720. The condenser lens array 720 may be arranged apart from the shielding plate 730 and the array of polarization separating units 740 (that is, near to the first optical element 71).

Figure 9:
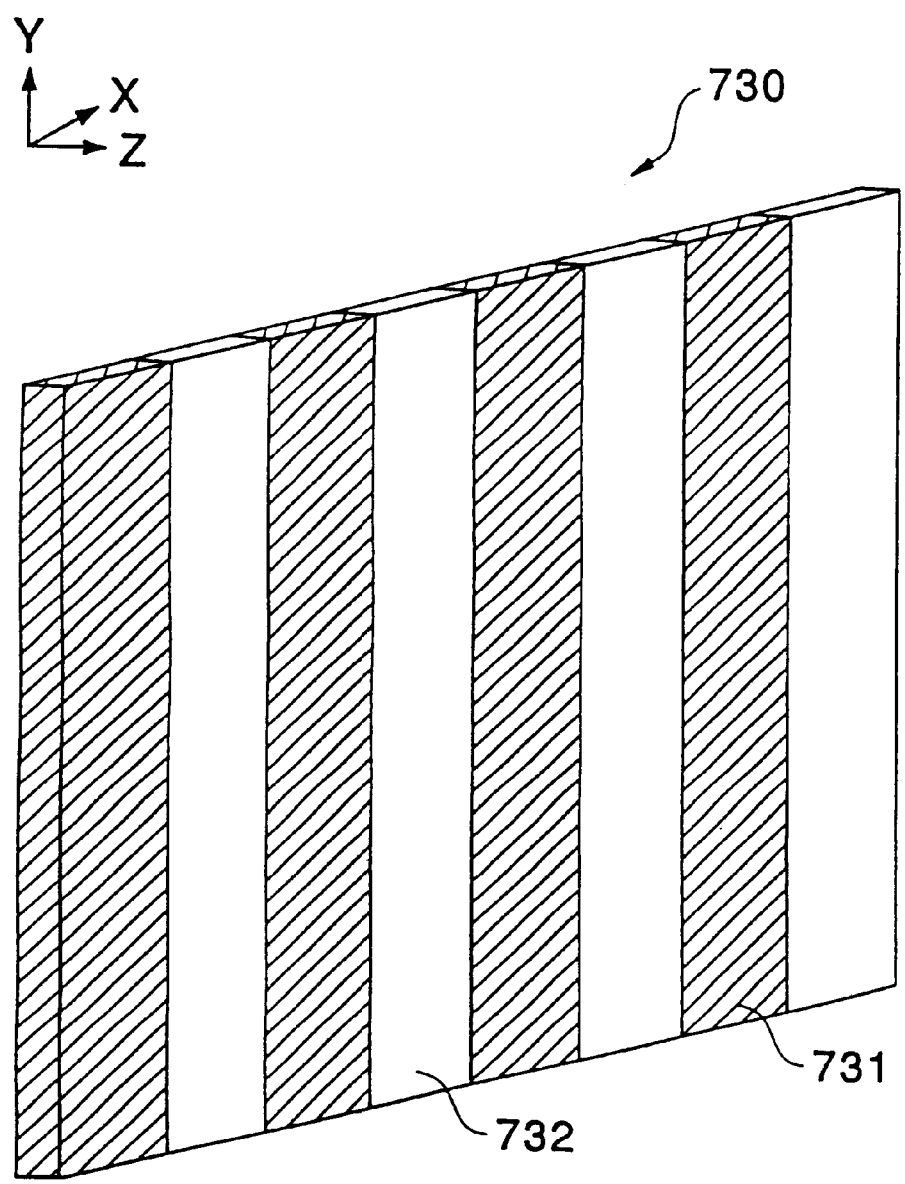
FIG. 9 is a perspective view illustrating the shielding plate of FIG. 8.

FIG. 9 is a perspective view illustrating the appearance of the shielding plate 730. As shown in FIG. 9, the shielding plate 730 includes a plurality of shielding surfaces 731 and a plurality of opening surfaces 732 arranged in a matrix. The arrangement of the shielding surfaces 731 and the opening surfaces 732 corresponds to the arrangement of the array of polarization separating units 740 discussed later. The light fluxes entering the shielding surfaces 731 of the shielding plate 730 are blocked, whereas the light fluxes entering the opening surfaces 732 are allowed to pass through the shielding plate 730. The shielding plate 730 accordingly has the function of controlling the transmission of light fluxes according to the position on the shielding plate 730. The arrangement of the shielding surfaces 731 and the opening surfaces 732 is specified to cause the converged images 713 by the first optical element 71 to be formed only on polarization separating surfaces 741 of the array of polarization separating units 740 as discussed later. In this embodiment, the shielding plate 730 is a transparent flat plate (for example, a glass plate) partly covered with a light-shielding film (for example, a chromium film, an aluminum film, or a dielectric multi-layered film). In another example, the shielding plate 730 may be a light-shielding flat plate, such as an aluminum plate, with openings. In case that the light-shielding film is applied for the shielding surfaces, the light-shielding film may be formed directly on the condenser lens array 720 or the array of polarization separating units 740 discussed later.

Figure 10:
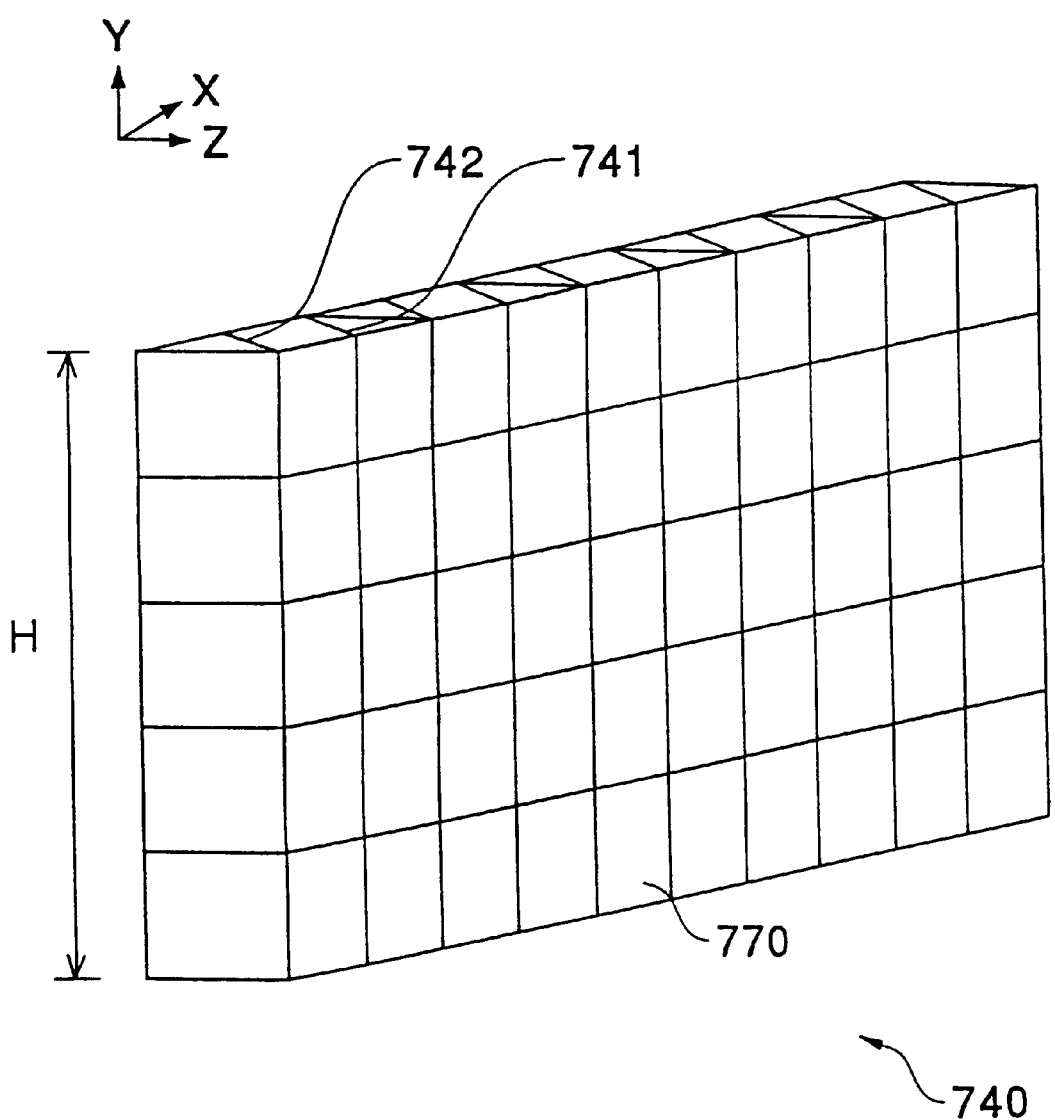
FIG. 10 is a perspective view illustrating the array of polarization separating units of FIG. 8.

FIG. 10 is a perspective view illustrating the appearance of the array of polarization separating units 740. As shown in FIG. 10, the array of polarization separating units 740 includes a plurality of polarization separating units 770 arranged in a matrix. The arrangement of the polarization separating units 770 corresponds to the lens characteristics and the arrangement of the flux division lenses 711 of the first optical element 71. In this embodiment, the concentric flux division lenses 711 having an identical shape are arranged in an orthogonal matrix to constitute the first optical element 71. The polarization separating units 770 having an identical shape are thus arrayed in a fixed direction and arranged in an orthogonal matrix to constitute the array of polarization separating units 740. When all the polarization separating units aligned in the same row in the y direction have an identical shape, a plurality of long polarization separating units that have the longitudinal axis in the y direction and a height H identical with the height of the array of polarization separating units 740 may be arrayed in the x direction and combined with one another to construct the array of polarization separating units. This structure improves the degree of flatness of an interface in the x direction between the adjacent long polarization separating units. Such construction accordingly lowers the light loss in the interface between the adjacent polarization separating units and reduces the manufacturing cost for the array of polarization separating units.

In this embodiment, the array of polarization separating units 740 is described as a complex of the plurality of polarization separating units 770. The concept of the basic structural units, that is, the polarization separating units, is, however, only used to explain the function of the array of polarization separating units. Namely the array of polarization separating units 740 may be formed integrally, instead of as a complex of the basic structural units or the polarization separating units. This modified structure is free of the light loss in the interface between the adjacent polarization separating units.

Figure 11:
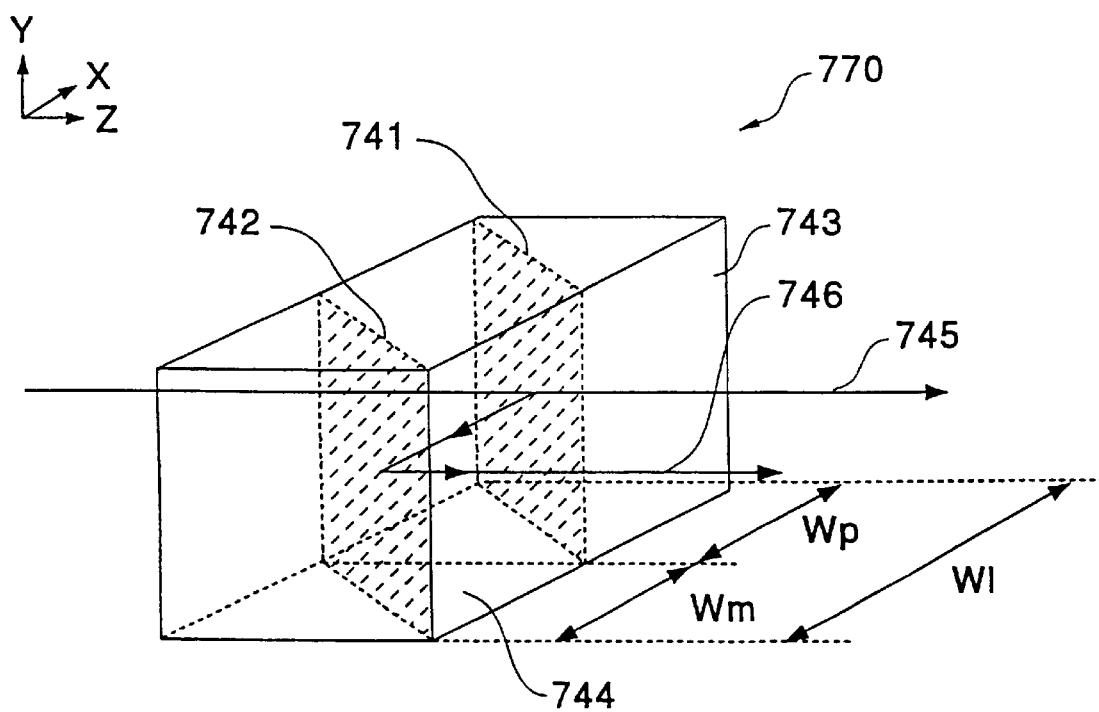
FIG. 11 shows structure and function of each polarization separating unit included in the array of polarization separating units of FIG. 8.

FIG. 11 illustrates the appearance and function of each polarization separating unit 770. As shown in FIG. 11, the polarization separating unit 770 is a quadratic prism including a polarization separating surface 741 and a reflection surface 742, and has the function of spatially separating each of the intermediate light fluxes entering the polarization separating unit into a p-polarized light flux and an s-polarized light flux. The outer shape of the polarization separating unit 770 on the x-y plane is similar to the outer shape of the flux division lens 711 on the x-y plane; that is, a wide rectangular shape. The polarization separating surface 741 and the reflection surface 742 are aligned in the longitudinal direction of the contour of the polarization separating unit 770, that is, in the lateral direction (x direction). The polarization separating surface 741 is arranged to have a slope of approximately 45 degrees to the system optical axis L, whereas the reflection surface 742 is parallel to the polarization separating surface 741. The area of projection of the polarization separating surface 741 on the x-y plane (that is identical with the area of a p-output plane 743 discussed later) is equal to the area of projection of the reflection surface 742 on the x-y plane (that is identical with the area of an s-output plane 744 discussed later). In this embodiment, a width Wp of the area on the x-y plane where the polarization separating surface 741 exists is equal to a width Wm of the area on the x-y plane where the reflection surface 742 exists. Both the widths Wp and Wm are half a width WI of the polarization separating unit on the x-y plane. The polarization separating surface 741 is generally composed of a dielectric multi-layered film, whereas the reflection surface 742 is composed of either a dielectric multi-layered film or an aluminum film.

The light entering the polarization separating unit 770 is separated by the polarization separating surface 741 into a p-polarized light flux 745, which does not change the course and passes through the polarization separating surface 741, and an s-polarized light flux 746, which is reflected by the polarization separating surface 741 and changes the course toward the adjoining reflection surface 742. The p-polarized light flux 745 reaches the p-output plane 743 and is output from the polarization separating unit 770. The s-polarized light flux 746 changes the course again on the reflection surface 742 to be substantially parallel to the p-polarized light flux 745, reaches the s-output plane 744, and is eventually output from the polarization separating unit 770. The polarization separating unit 770 separates the incident light flux of random polarization into the p-polarized light flux 745 and the s-polarized light flux 746, which have different polarizing directions but are output in a substantially identical direction from the different places of the polarization separating unit 770 (that is, the p-output plane 743 and the s-output plane 744).

It is required to lead the intermediate light flux 712 (see FIG. 8) entering each polarization separating unit 770 to the area where the polarization separating surface 741 exists. The positional relationship between the respective polarization separating units 770 and the respective condenser lenses 721 and the lens characteristics of the respective condenser lenses 721 are specified to enable the intermediate light flux 712 to form a secondary light-source image in the vicinity of the central portion of each polarization separating surface 741. In this embodiment, each condenser lens is arranged to position its central axis in the central portion of the polarization separating surface 741 included in each polarization separating unit 770. The condenser lens array 720 is accordingly shifted in the x direction from the array of polarization separating units 740 by the distance D (see FIG. 8), which corresponds to one quarter of the width WI of each polarization separating unit.

Referring back to FIG. 8, the shielding plate 730 is interposed between the array of polarization separating units 740 and the condenser lens array 720. The centers of the respective opening surfaces 732 in the shielding plate 730 are arranged to substantially coincide with the centers of the polarization separating surfaces 741 of the respective polarization separating units 770. The opening width of each opening surface 732 (that is, the opening width in the x direction) is set to be approximately half the width WI of the polarization separating unit 770. There exist substantially no intermediate light fluxes that directly enter the reflection surfaces 742 but not via the polarization separating surfaces 741, since such intermediate light fluxes have been blocked by the shielding surfaces 731 of the shielding plate 730. Almost all the light fluxes passing through the opening surfaces 732 of the shielding plate 730 enter only the polarization separating surfaces 741. Because of the presence of the shielding plate 730, there exist substantially no light fluxes that directly enter the reflection surfaces 742 and then go to the adjoining polarization separating surfaces 741 in the polarization separating units.

The selective phase difference plate 750 including λ/2 phase difference plates 751 arranged in a regular manner is placed on the side of the output planes of the array of polarization separating units 740. More concretely, the λ/2 phase difference plates 751 are placed corresponding to the p-output planes 743 (see FIG. 11) of the respective polarization separating units 770, whereas no λ/2 phase difference plates 751 are placed corresponding to the s-output planes 744. Such arrangement of the λ/2 phase difference plates 751 causes the p-polarized light flux output from the polarization separating unit 770 to be subjected to a rotation in the polarizing direction in the course of passing through the λ/2 phase difference plate 751 and to be converted to the s-polarized light flux. The s-polarized light flux output from the s-output plane 744, on the other hand, does not enter the λ/2 phase difference plate 751, but passes through the selective phase difference plate 750 with the polarizing direction unchanged. Namely the array of polarization separating units 740 and the selective phase difference plate 750 convert the intermediate light fluxes of random polarizing directions to the light fluxes of identical polarizing direction (the s-polarized light fluxes in this case).

The superposing lens 760 is placed on the side of the output plane of the selective phase difference plate 750. The light fluxes adjusted to the s-polarized light fluxes by the function of the selective phase difference plate 750 are led by the superposing lens 760 to the illumination area 4 and superposed thereon. The superposing lens 760 may not be one independent lens body but a complex of a plurality of lenses like the first optical element 71.

In summary, the second optical element 72 has the following functions. The intermediate light fluxes 712 divided by the first optical element 71 (which fluxes represent image planes cut by the flux division lenses 711) are superposed on the illumination area 4 by the function of the second optical element 72. The array of polarization separating units 740 spatially separate the intermediate light fluxes of random polarization into two different polarized light fluxes having different polarizing directions. The selective phase difference plate 750 then converts these polarized light fluxes to the light fluxes of substantially identical polarizing directions. The shielding plate 730 is placed on the side of the entrance planes faces of the array of polarization separating units 740, in order to cause the intermediate light fluxes to enter only the polarization separating surfaces 741 included in the polarization separating units 770. There accordingly exist substantially no intermediate light fluxes that enter the reflection surfaces 742 and the polarization separating surfaces 741 in this order. The polarized light fluxes output from the polarization separating units 770 are thus restricted to substantially one type. This means that the illumination area 4 is uniformly illuminated with the light fluxes of substantially identical polarizing directions.

As discussed above, the size of the converged images 712 formed by the first optical element 71 is affected by the parallelism of the light fluxes entering the first optical element 71 (the light fluxes emitted from the light source in the case of the lighting device). The poor parallelism results in converged images of large dimensions. In such a case, there exist many intermediate light fluxes that directly enter the reflection surfaces but not via the polarization separating surfaces in the polarization separating units. This causes the polarized light fluxes having different polarizing directions to be undesirably mixed with each other for illumination. The polarizing lighting device of FIG. 8 has the shielding plate 730, which is especially effective when the light source in the polarizing lighting device emits the light fluxes of poor parallelism.

When most of the intermediate light fluxes directly enter the polarization separating surfaces 741 (that is, little intermediate light fluxes directly enter the reflection surfaces 742), the shielding plate 730 can be omitted. The condenser lens array 720 may also be omitted when the light fluxes output from the light source unit have high parallelism.

As described above, the polarizing lighting device 60 of the embodiment exerts the similar effects to those of the lighting device 1 as well as the additional effects described below. The polarizing unit 7 including the first optical element 71 and the second optical element 72 converts the light fluxes of random polarization emitted from the light source unit 2 to the light fluxes of substantially identical polarizing directions, and enables the illumination area 4 to be illuminated uniformly with the light fluxes of substantially identical polarizing directions. This structure is virtually free of the light loss in the course of generating the polarized light fluxes, so that almost all the light fluxes emitted from the light source unit can be led to the illumination area 4. This attains an extremely high utilization efficiency of light. The shielding plate 730 included in the second optical element 72 effectively prevents the light fluxes of different polarizing directions from being mixed with each other for illuminating the illumination area 4. When the polarizing lighting device of the present invention is used to illuminate a modulation means for carrying out a display with polarized light fluxes, such as a liquid crystal device, a polarizing plate conventionally placed on the light-entrance side of the modulation means may be omitted. Even when the polarizing plate is required, an extremely little quantity of light absorption in the polarizing plate remarkably reduces the size of a cooling device required for preventing a temperature increase of the polarizing plate and the modulation means.

In this embodiment, the condenser lens array 720, the shielding plate 730, the array of polarization separating units 740, the selective phase difference plate 750, and the superposing lens 760, which are all the constituents of the second optical element 72, are optically integrated with one another. Such arrangement reduces the light loss in the respective interfaces and further enhances the utilization efficiency of light. The term 'optically integrated' implies that the respective optical elements are in close contact with one another. The plurality of optical elements are optically integrated by bonding them with an adhesive or by integrally forming them.

The flux division lenses 711 of the first optical element 71 are of a wide shape corresponding to the wide rectangular shape of the illumination area 4, and separate the two different polarized light fluxes output from the array of polarization separating units 740 in the lateral direction (x direction). The structure of the embodiment does not waste the quantity of light but enables the illumination area 4 of the wide rectangular shape to be illuminated with a high efficiency (utilization efficiency of light).

When the light fluxes of random polarizing directions are simply separated into the p-polarized light fluxes and the s-polarized light fluxes, the total width of the light fluxes after the separation is doubled and makes the optical system undesirably bulky. In the polarizing lighting device of the present invention, the first optical element 71 functions to form the plurality of small converged images 713, while the reflection surfaces 742 are disposed in the space where no converged images 713 exist. This arrangement absorbs the extension of the optical path in the lateral direction due to the separation into two different polarized light fluxes and effectively prevents an increase in total width of the light fluxes, thereby reducing the size of the optical system.

(Third Embodiment)

The following describes a projector-type display apparatus with a polarizing lighting device 60A incorporated therein, which basically has the identical structure to that of the lighting device 60 described above. In this embodiment, a transmission liquid-crystal device is used as a modulation means for modulating light fluxes output from the polarizing lighting device responsive to display information.

Figure 12:
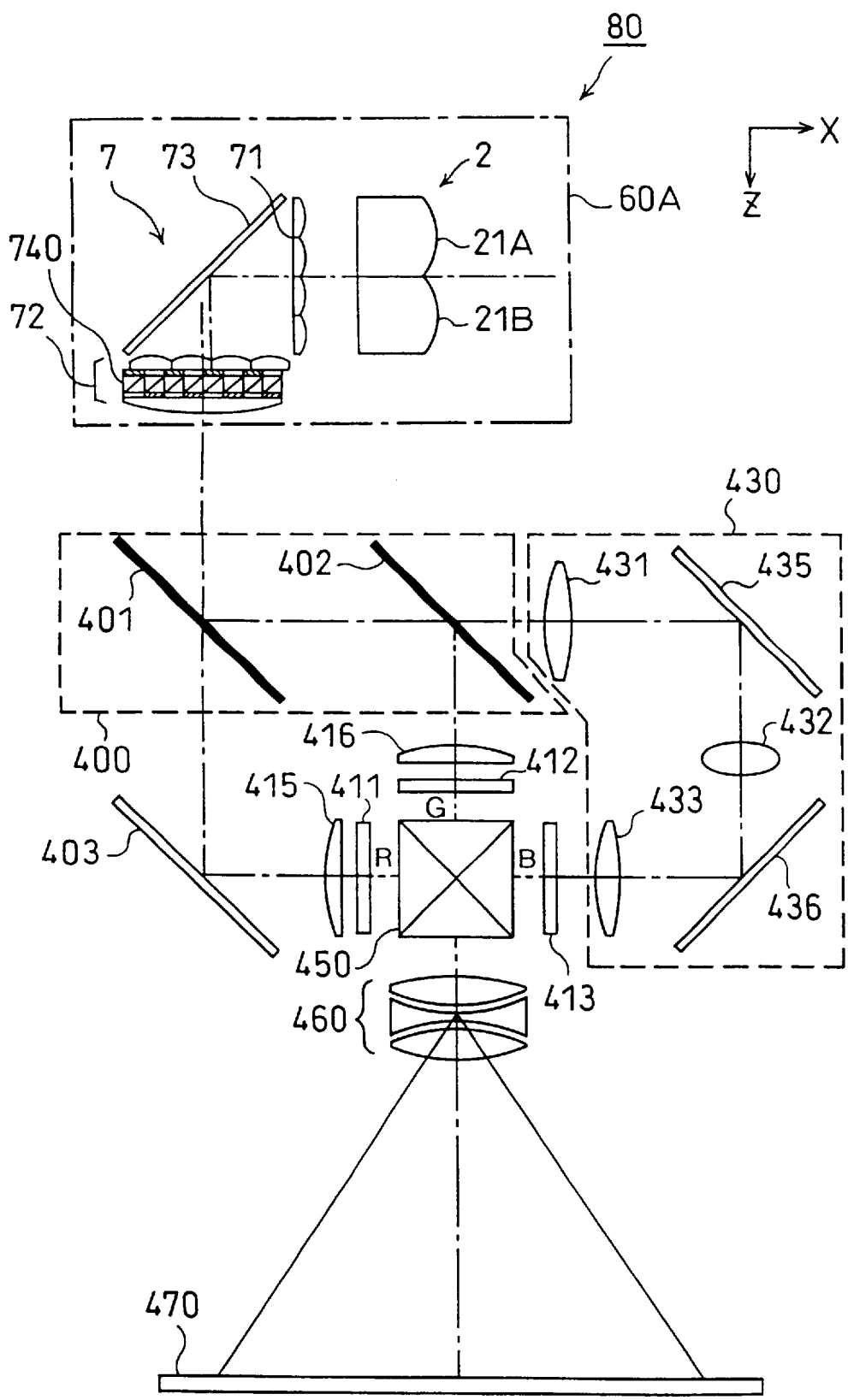
FIG. 12 schematically illustrates an essential part of an optical system of a projector-type display apparatus as a third embodiment according to the present invention.

FIG. 12 schematically illustrates the x-y plane structure of an essential part of an optical system included in a projector-type display apparatus 80 embodying the present invention. The projector-type display apparatus 80 of the embodiment essentially includes the polarizing lighting device 60A, a color separation optical system 400 for separating a white color light flux into three color rays, three transmission liquid-crystal devices 411, 412, and 413 for modulating the respective color rays responsive to display information to generate display images, a cross dichroic prism 450 functioning as a color combining means for combining the three color rays to create a color image, and a projection lens 460 functioning as a projection optical system for projecting and displaying the color image.

The polarizing lighting device 60A includes a light source unit 2 having a pair of lamp units 21A and 21B for emitting light fluxes of random polarization in one direction. The light fluxes of random polarization emitted from the light source unit 2 are converted by a polarizing unit 7 to light fluxes of substantially identical polarizing directions. In the polarizing lighting device 60A of the embodiment, a first optical element 71 and a second optical element 72 of the polarizing unit 7 are arranged to have their optical axes perpendicular to each other, and a reflection mirror 73 is disposed between these optical elements 71 and 72 at an angle of 45 degrees with respect to both the optical elements 71 and 72. The other constituents of the polarizing lighting device 60A are identical with those of the polarizing lighting device 60, and are thus not specifically described here.

A blue-green light reflection dichroic mirror 401 of the color separation optical system 400 causes a red light component of the light flux emitted from the polarizing lighting device 60A to be transmitted, whereas causing blue and green light components to be reflected. The red light component is reflected from a reflection mirror 403 and reaches a red-light liquid-crystal device 411 via a field lens 415. The green light component is reflected by a green light reflection dichroic mirror 402 of the color separation optical system 400 and reaches a green-light liquid-crystal device 412 via a field lens 416. Each of the field lenses 415 and 416 has the function of converting the incident light flux to a light flux parallel to its center axis.

The length of the optical path of the blue light component is greater than those of the optical paths of the other two color components, so that a light-leading optical system 430 including a relay lens system consisting of an entrance lens 431, a relay lens 432, and an exit lens 433 is provided for the blue light component. The blue light component passes through the green light reflection dichroic mirror 402, goes through the entrance lens 431, is reflected by a reflection mirror 435 to be led to and focused on the relay lens 432, is reflected again by a reflection mirror 436 to be led to the exit lens 433, and eventually reaches a blue-light liquid-crystal device 413. The exit lens 433 has the same function as those of the field lenses 415 and 416.

The three liquid-crystal devices 411, 412, and 413 are transmission liquid-crystal panels (also called 'liquid-crystal light bulbs') that modulate the respective color rays to represent respective image information and cause such modulated color rays to enter the cross dichroic prism 450. The cross dichroic prism 450 has a dielectric multi-layered film for reflecting red light and a dielectric multi-layered film for reflecting blue light, which are formed in a cross shape, to combine the modulated color light fluxes to create a color image. The color image is expanded and projected on a screen 470 as a projection image by the projection lens 460.

The projector-type display apparatus 80 uses the polarizing lighting device 60A with the two lamp units 21A and 21B and accordingly forms bright projection images.

In accordance with one preferable structure, a driving circuit of the polarizing lighting device 60A may simultaneously turn on both the lamp units 21A and 21B or selectively turn on either one of the lamp units 21A and 21B. For example, when the required illuminance is relatively low, only one lamp unit is turned on. This structure enables projection images of optimum brightness to be formed according to the circumferences.

The projector-type display apparatus 80 of the embodiment includes the liquid-crystal devices for modulating light fluxes of a single polarization type. When the light fluxes of random polarization are output from a conventional lighting device to the liquid-crystal devices, approximately half the light fluxes of random polarization are absorbed and changed to heat by polarizing plates (not shown). This worsens the utilization efficiency of light and requires a large-sized, rather noisy cooling device for cooling the polarizing plates. The projector-type display apparatus 80 of the embodiment, on the other hand, effectively solves these problems. In the projector-type display apparatus 80 of the embodiment, the polarizing lighting device 60A causes light fluxes on a single polarization type, for example, only the p-polarized light fluxes, to be subjected to a rotation of the polarizing plane in a λ/2 phase difference plate and converted to the other type of polarized light fluxes, for example, s-polarized light fluxes. The light fluxes of substantially identical polarizing directions are accordingly led to the three liquid-crystal devices 411, 412, and 413. This structure of the embodiment remarkably reduces absorption of light by the polarizing plates and enhances the utilization efficiency of light, thereby producing bright projection images.

The polarizing lighting device 60A used here as the lighting device includes the shielding plate 730 arranged inside the second optical element 72. This arrangement effectively prevents light fluxes of the other polarization type unrequired for the display of the liquid-crystal devices from being present in the light output from the polarizing lighting device 60A for illumination. This remarkably decreases the absorption of light by polarizing plates (not shown) arranged on the light-entering side of the three liquid-crystal devices 411, 412, and 413 and thereby remarkably lessens the heat due to the absorption of light, thus significantly reducing the size of a cooling device for preventing a temperature increase of the polarizing plates and the liquid-crystal devices.

A small-sized cooling device is accordingly sufficient even for the projector-type display apparatus that utilizes extremely powerful light source lamps to display extremely bright projection images. This structure reduces the noise of the cooling device and realizes a still, high-performance projector-type display apparatus.

In the polarizing lighting device 60A, the second optical element 72 spatially separates the two different polarized light fluxes in the lateral direction (in the x direction). This structure does not waste the quantity of light but efficiently illuminates the liquid crystal devices of a wide rectangular shape.

Although the polarization converting optical elements are incorporated in the polarizing lighting device 60A, the structure of the embodiment effectively prevents the extension of the width of light fluxes output from the array of polarization separating units 740. This means that there exists substantially no light entering the liquid-crystal devices with a large angle for illumination. This structure realizes bright projection images without an extremely large-diametral projection lens system having a small F number, thereby effectively reducing the size of the projector-type display apparatus.

In this embodiment, the cross dichroic prism 450 is used as a color combining means. This further reduces the size of the apparatus. Since the optical paths between the respective liquid crystal devices 411, 412, and 413 and the projection lens system 460 are short, even a relatively small-diametral projection lens system can produce bright projection images. Although the length of the optical path of one color ray is different from those of the other two color rays, the light-leading optical system 430 including the relay lens system consisting of the entrance lens 431, the relay lens 432, and the exit lens 433 is provided for the blue light component having the longest optical path. This effectively prevents unevenness of colors.

The projector-type display apparatus may utilize a mirror optical system using two dichroic mirrors as the color combining means. The polarizing lighting device of the embodiment can also be incorporated in such a modified structure. Like the above embodiment, the modified structure has high utilization efficiency of light and produces bright, high-quality projection images.

Although the light fluxes of random polarization are converted to the s-polarized polarized light fluxes in this embodiment, they may be converted to the p-polarized light fluxes.

(Fourth Embodiment)

FIG. 13 schematically illustrates another polarizing lighting device embodying the present invention. Like the polarizing lighting devices 60 and 60A, a polarizing lighting device 90 of this embodiment includes a light source unit 2 and a polarizing unit 7'. Two lamp units 21A and 21B of the light source unit 2 are arranged in parallel in the y-axis direction to have their lamp optical axes 21L parallel to a system optical axis 90L. Like the polarizing unit 7, the polarizing unit 7' has the function of converting the light fluxes of random polarization emitted from the light source unit 2 to light fluxes of substantially identical polarizing directions and causing the illumination area 4 to be illuminated substantially uniformly with the light fluxes of substantially identical polarizing directions.

Like the first optical element 71 shown in FIG. 8, a first optical element 71' included in the polarizing unit 7' is a lens array in which flux division lenses 711' are arranged in a 4×4 matrix. The flux division lenses 711' include four kinds of rectangular flux division lenses 711a', 711b', 711c', and 711d' according to the position in the y direction. The flux division lenses 711a', 711b', 711c', and 711d' are eccentric lenses which deviate the centers of the light fluxes output from the respective lenses only in the y direction.

Like the second optical element 72 shown in FIG. 8, a second optical element 72' includes a condenser lens array 720', a shielding plate 730', an array of polarization separating units 740', a selective phase difference plate 750', and a superposing lens 760'. Like the condenser lens array 720 (FIG. 8), the condenser lens array 720' includes condenser lenses 721' arranged in a 4×4 matrix corresponding to the first optical element 71'. Like the flux division lenses 711', the condenser lenses 721' include four kinds of rectangular condenser lenses 721a', 221b', 721c', and 721d' having different amounts of eccentricity according to the position in the y direction. The condenser lenses 721' have smaller dimensions in the y direction than the flux division lenses 711', so that the condenser lens array 720' has a smaller dimension in the y direction than the first optical element 71'.

Like the array of polarization separating units 740 shown in FIG. 8, the array of polarization separating units 740' include a plurality of polarization separating units 770' arranged in a matrix. Like the polarization separating unit 770 shown in FIG. 11, the polarization separating unit 770' has a polarization separating surface 741' and a reflection surface 742' aligned in the x direction to separate the incident light fluxes of random polarization in the x direction to two different polarized light fluxes of different polarizing directions. Corresponding to the dimension of the condenser lens 721', the dimension of the polarization separating unit 770' in the y direction is smaller than that of the polarization separating unit 770 of FIG. 11. Similarly, corresponding to the dimension of the condenser lens array 720', the dimension of the array of polarization separating units 740' in the y direction is smaller than that of the array of polarization separating units 740.

The shielding plate 730', the selective phase difference plate 750', and the superposing lens 760' are respectively arranged to have the dimensions corresponding to that of the array of polarization separating units 740'.

As discussed above, the polarizing lighting device 90 of this embodiment is characterized by the structure of the respective constituents of the first optical element 71' and the second optical element 72'. The basic arrangements and functions of the respective constituents are similar to those of the first optical element 71 and the second optical element 72 shown in FIG. 8, and are thus not specifically described here. The following further describes the structural characteristics of the respective constituents of the first optical element 71' and the second optical element 72'.

The outer shape of the flux division lenses 711' is substantially similar to the shape of the illumination area 4, in order to enable the illumination area 4 to be illuminated most efficiently with the intermediate light fluxes divided by the flux division lenses 711'. When the polarizing light device 90 of the embodiment is applied to a projector-type display apparatus, such as the projector-type display apparatus 80 (FIG. 12), the illumination area 4 corresponds to the liquid-crystal devices 411, 412, and 413. The aspect ratio (width to length) of the display area is 4 to 3 in the liquid-crystal devices 411, 412, and 413. In this embodiment, the length of the flux division lens 711' is three quarters its width LW in the lateral direction (in the x direction). The length of the condenser lens 721' is two quarters its width LW. The reason of these dimensions is given below.

Figure 14A:
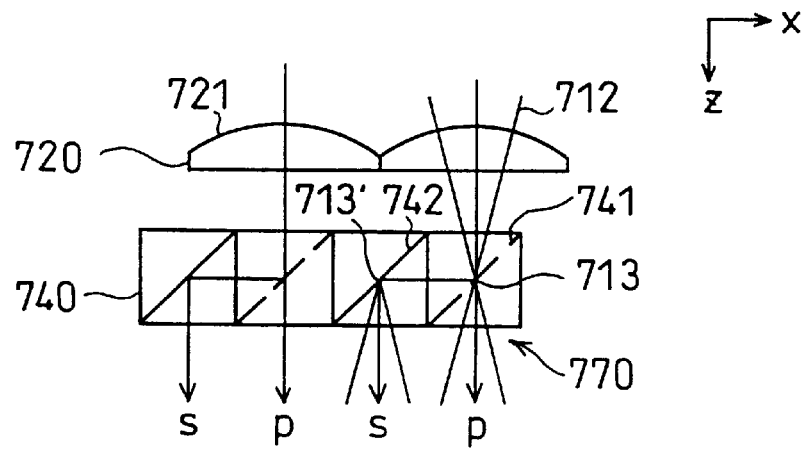
FIG. 14 shows converged images of a light source formed by the flux division lenses and the condenser lenses of FIG. 13.
Figure 14B:
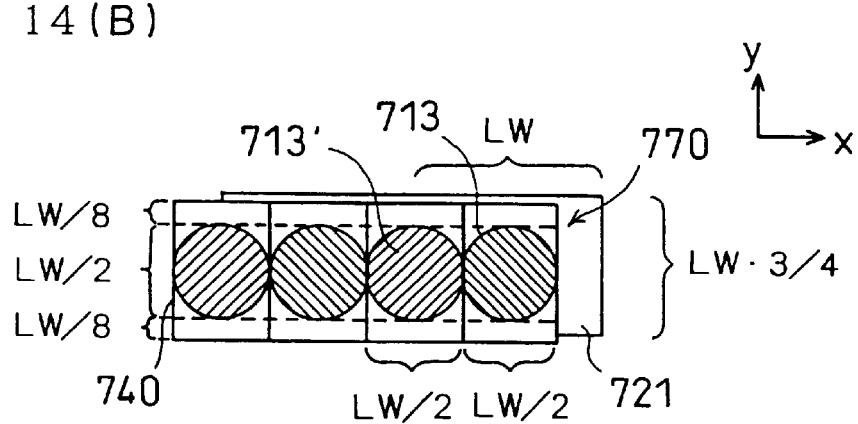

FIG. 14 shows converged images formed by the flux division lenses 711' and the condenser lenses 721'. FIG. 14(A) illustrates part of the condenser lens array 720 and the array of polarization separating units 740 included in the polarizing lighting device 60 of FIG. 8, seen from the y direction. FIG. 14(B) illustrates the same, seen from the z direction. Although the condenser lenses 721 are drawn while shifted a littl in the y direction for the clarity of illustration in FIG. 14(B), they are not so shifted in the actual state. The intermediate light flux 712 passing through the condenser lens 721 is focused at the substantial center on the polarization separating surface 741 included in the polarization separating unit 770 by means of the flux division lens 721 (see FIG. 8) and the condenser 711. The converged image 713 is accordingly formed on the polarization separating surface 741. Similarly, a converged image 713' having substantially the same size as that of the converged image 713 is formed on the reflection surface 742. Since the distance between the entrance plane and the exit plane of the polarization separating unit 770 is relatively small, the sizes of the incident light flux and the output light flux of the polarization separating unit 770 are also substantially identical with the size of the converged image 713. The following description is therefore made using the size of the converged image 713 in the place of the sizes of the incident light flux and the output light flux of the polarization separating unit 770.

If the intermediate light flux 712 were not focused but simply separated into the p-polarized light flux and the s-polarized light flux, the total width of the light fluxes after the separation would be doubled and makes the optical system undesirably bulky. In the polarizing lighting device 60, in order to prevent the optical system from being bulky, the reflection surface 742 of the polarization separating unit 770 is disposed in the space which is produced by focusing the plurality of intermediate light fluxes 712 and where no light exists. In the polarizing lighting device 60, as shown in FIG. 14(B), the dimension in the x direction of a projection of the polarization separating surface 741 on the x-y plane is substantially identical with the dimensions in the x direction of projections of the converged images 713 and 713' on the x-y plane, and is approximately equal to half the width LW of the condenser lens 721 in the x direction. Similarly, the dimension in the x direction of a projection of the reflection surface 742 on the x-y plane is approximately equal to half the width LW. The dimension in the y direction of the projection of the polarization separating surface 741 on the x-y plane is approximately equal to the dimension, (LW.¾), of the condenser lens 721 in the y direction. Similarly, the dimension in the y direction of the projection of the reflection surface 742 on the x-y plane is approximately equal to the dimension (LW.¾).

Figure 14C:
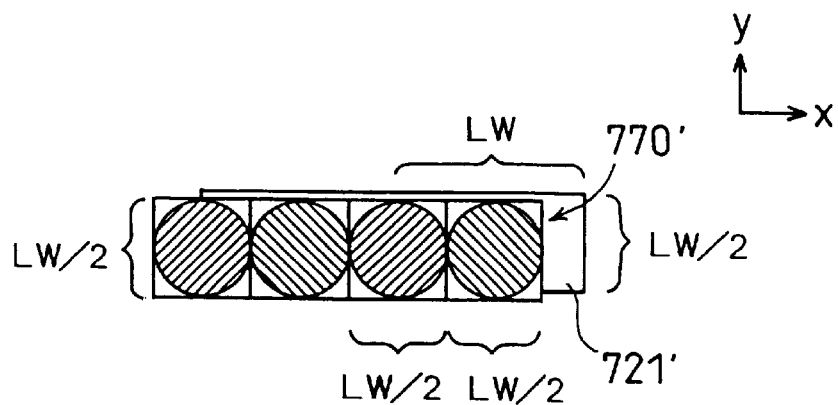

The converged images 713 and 713' projected on the x-y plane are here approximated to be virtually circular. As shown in FIG. 14(B), in the area of the polarization separating unit 770 in the y direction, the area between the upper end and the position apart therefrom in the y direction by ⅛ of the width LW and the area between the lower end and the position apart therefrom in the y direction by ⅛ of the width LW are hardly utilized (substantially no light exists in these areas). In other words, the condenser lens 721 and the polarization separating unit 770 can be reduced by the size corresponding to one quarter of the width LW in the y direction. From this reason, in the polarizing lighting device 90 of the embodiment, the dimension of the condenser lens 721' in the y direction is made smaller than the dimension (LW.¾) of the condenser lens 721 in the y direction by (LW.¼) as shown in FIG. 14(C).

The reduction of the dimension of the condenser lens 721' in the y direction to LW/2 results in reducing the size of the whole condenser lens array 720' in the y direction. For application of this condenser lens array 720', the condenser lenses 721' and the flux division lenses 711' should be formed as discussed below.

Figure 15A:
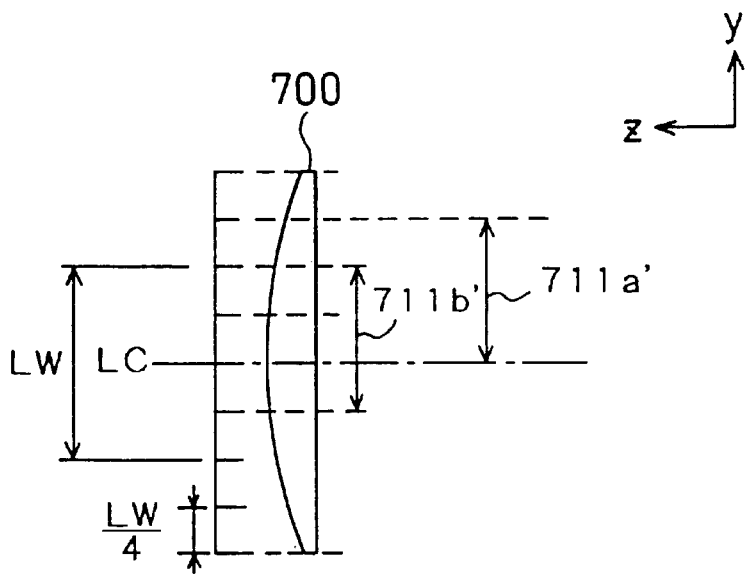
FIG. 15 illustrates structure of the flux division lenses and the condenser lenses of FIG. 13.

FIG. 15 illustrates structures of the flux division lenses 711' and the condenser lenses 721'. The flux division lens 711' is a rectangular lens prepared by cutting a known concentric lens 700 by a width LW about an optical axis LC in the x direction and at either one of two positions 711a' and 711b' shown in FIG. 15(A) in the y direction. The flux division lens 711' is accordingly formed as an eccentric lens in which the positions of the lens center and the optical axis are different in the y direction. The first flux division lens 711a' is cut in an x-z plane including the position of the lens center (optical axis) LC of the concentric lens 700 and the position apart from the lens center LC upward in the y direction by a distance (LW.¾). The second flux division lens 711b' is cut in the x-z plane including the position apart from the lens center LC downward in the y direction by a distance (LW/4) and the position apart from the lens center LC upward in the y direction by a distance (LW.²⁄₄). The other flux division lenses 711c' and 711d' shown in FIG. 13(B) are the upside-down of the flux division lenses 711a' and 711b'.

Figure 15B:
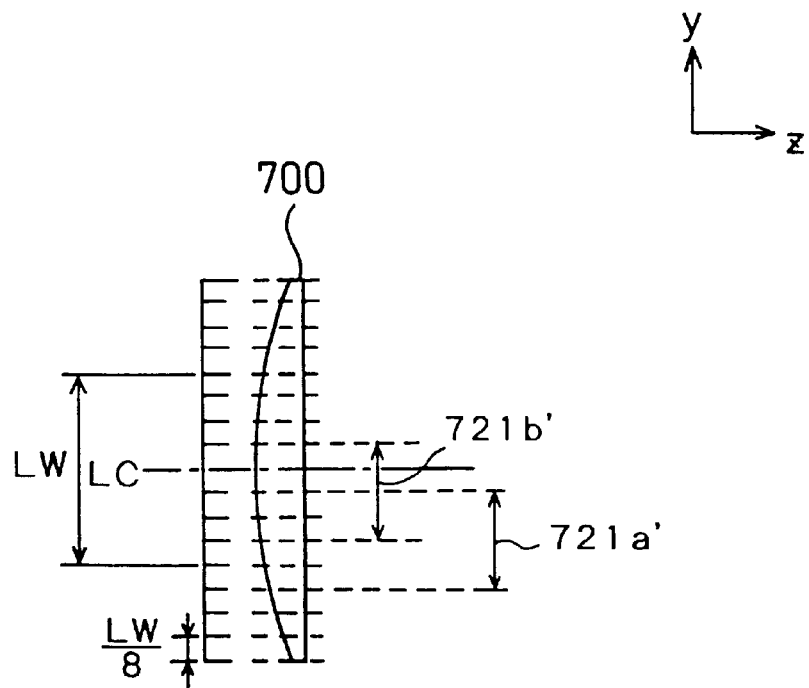

The condenser lens 721' is a rectangular lens prepared by cutting the known concentric lens 700 by the width LW about the optical axis LC in the x direction and at either one of two positions 721a' and 721b' shown in FIG. 15(B) in the y direction. The condenser lens 721' is accordingly formed as an eccentric lens in which the positions of the lens center and the optical axis are shifted in the y direction. The first condenser lens 721a' is cut in the x-z plane including the position apart from the lens center LC downward in the y direction by a distance (LW.⅝) and the position apart from the lens center LC downward in the y direction by a distance (LW/8). The second condenser lens 721b' is cut in the x-z plane including the position apart from the lens center LC downward in the y direction by a distance (LW.⅜) and the position apart from the lens center LC upward in the y direction by a distance (LW.⅛).

Figure 16:
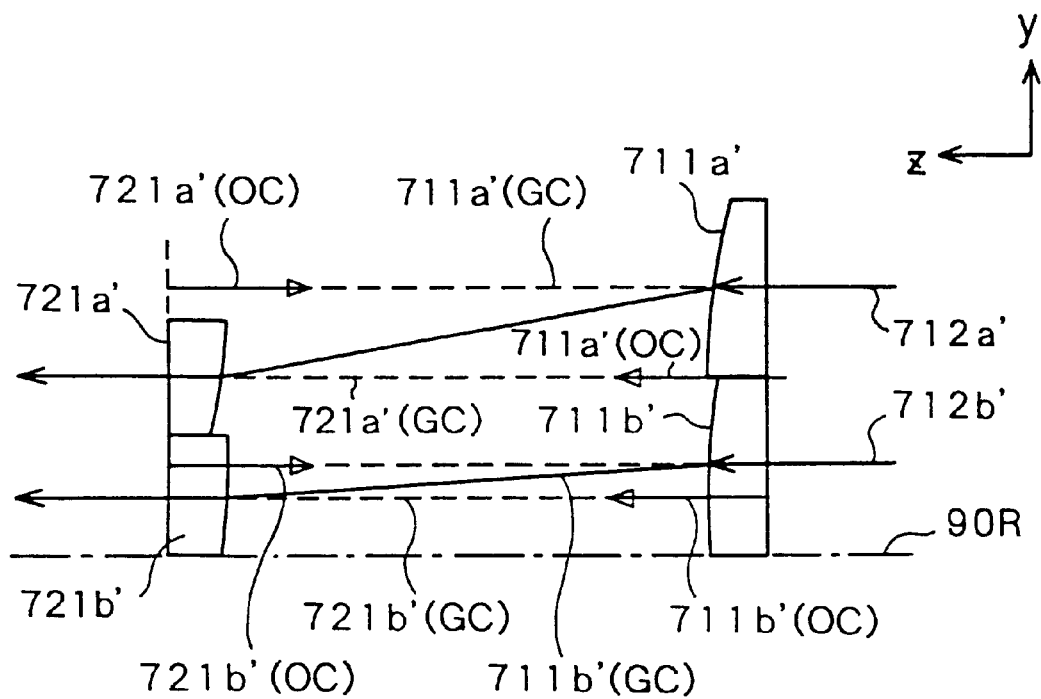
FIG. 16 shows the positional relationship between the flux division lenses and the condenser lenses of FIG. 13 in the y direction.

FIG. 16 shows the positional relationship between the flux division lenses 711' and the condenser lenses 721' in the y direction. The flux division lens 711a' and the corresponding condenser lens 721a' are arranged in such a manner that the position of a lens center 711a'(GC) of the flux division lens 711a' coincides with the position of an optical axis 721a'(OC) of the condenser lens 721a' and that the position of an optical axis 711a'(OC) of the flux division lens 711a' coincides with the position of a lens center 721a'(GC) of the condenser lens 721a'. Similarly, the flux division lens 711b' and the corresponding condenser lens 721b' are arranged in such a manner that the position of a lens center 711b'(GC) of the flux division lens 711b' coincides with the position of an optical axis 721b'(OC) of the condenser lens 721b' and that the position of an optical axis 711b'(OC) of the flux division lens 711b' coincides with the position of a lens center 721b'(GC) of the condenser lens 721b'.

The light flux entering the flux division lens 711a' is divided into intermediate light fluxes 712a' and deflected to pass through the approximate center of the corresponding condenser lens 721a'. For the simplicity of explanation, only the primary ray is shown as for the intermediate light fluxes 712a' divided by the flux division lens 711a'. The deflected intermediate light fluxes 712a' pass through the condenser lens 721a' and are deflected to be parallel to the course of the incident light flux of the flux division lens 711a', that is, to make the primary ray substantially parallel to a light source optical axis 90R. The output position of the intermediate light fluxes 712a' from the condenser lens 721a' is shifted from the output position of the intermediate light fluxes 712a' from the flux division lens 711a' in parallel toward the light source optical axis 90R. Similarly, the output position of the intermediate light fluxes 712b', which is divided by the flux division lens 711b', from the condenser lens 721b' is shifted from the output position of the intermediate light fluxes 712b' from the flux division lens 711b' in parallel toward the light source optical axis 90R. Deflection by the first optical element 71' and the condenser lens array 720' causes the optical path of the plurality of intermediate light fluxes 712' output from the condenser lens array 720' to be shifted in parallel toward the light source optical axis 90R in the y direction. The whole light fluxes passing through the condenser lens array 720' are accordingly compressed about the light source optical axis 90R in the y direction with respect to the light fluxes entering the first optical element 71'. The condenser lens array 720' having the smaller dimension in the y direction than that of the condenser lens array 720 (FIG. 8) can be used when the flux division lenses 711' and the condenser lenses 721' are formed to be appropriate eccentric lenses and arranged them in the appropriate positions as described above.

Figure 17A:
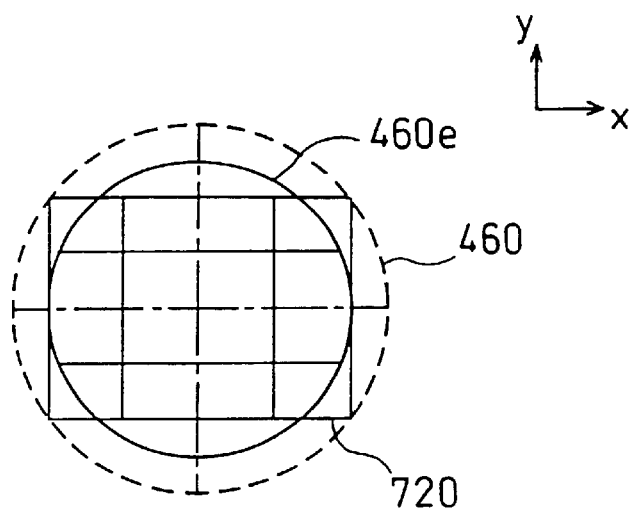
FIG. 17 shows incident rays entering a projection lens when the lighting device of FIG. 13 is applied to a projector-type display apparatus.

The polarizing lighting device 90 of the embodiment exerts the following effects. FIG. 17 illustrates the light entering the projection lens 460 when the polarizing lighting device 90 is applied to a projector-type display apparatus. The projection lens 460 effectively projects only the light component entering a lens pupil 460e shown in FIG. 17(A) on a projection plane, while not projecting the light component entering outside the lens pupil 460e. The incident angle range allowing projection (may also be called the 'entrance angle') varies as the position within the lens pupil 460e. The incident angle range is the largest at the center of the lens pupil 460e and decreases toward the periphery, so that the utilization efficiency of light in the projection lens is the highest at the center of the lens and worsens toward the periphery.

Figure 17B:
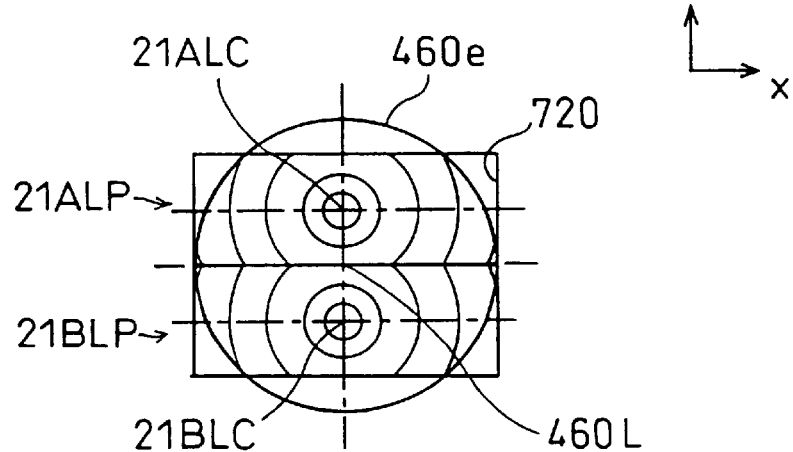

FIG. 17(B) shows intensity distributions of light 21ALP and 21BLP when the rays emitted from the lamp units 21A and 21B pass through the condenser lens array 720 and enter the lens pupil 460e of the projection lens 460, where the lamp units 21A and 21B of the polarizing lighting device 60A included in the projector-type display apparatus 80 shown in FIG. 12 are arrayed in the y direction like the polarizing lighting device 90. The intensity distributions of light 21ALP and 21BLP are shown as contours. As shown in FIG. 17(B), the intensity distribution of light 21ALP from the lamp unit 21A and the intensity distribution of light 21BLP from the lamp unit 21B have distribution centers 21ALC and 21BLC that are shifted respectively upward and downward from a center 460L of the projection lens. In the structure that the lamp units 21A and 21B are arrayed in the x direction, on the other hand, the intensity distribution of light 21ALP from the lamp unit 21A and the intensity distribution of light 21BLP from the lamp unit 21B have the distribution centers 21ALC and 21BLC that are shifted respectively leftward and rightward from the center 460L of the projection lens. As mentioned previously (see FIG. 4), the intensity of light is the highest in the vicinity of the distribution centers 21ALC and 21BLC and abruptly decreases toward the periphery in the intensity distributions of light 21ALP and 21BLP of the lamp units 21A and 21B. The utilization efficiency of light is the highest on the center of the projection lens and decreases toward the periphery as discussed above. When two lamp units are used as the light source of the lighting device, although the quantity of light from the lighting device increases as a whole, the utilization efficiency of light is not sufficiently high in the whole projector-type display apparatus since the centers 21ALC and 21BLC of the intensity distributions of light from the two lamp units are apart from the lens center 460L.

Figure 17C:
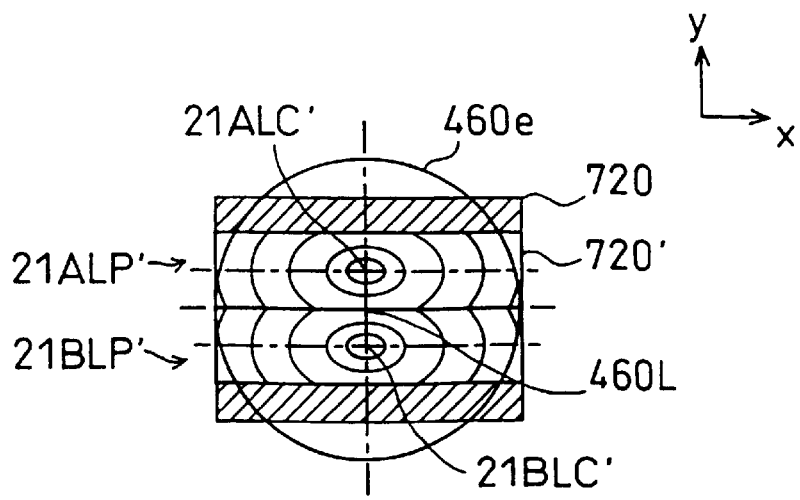

In the projector-type display apparatus with the polarizing lighting device 90 of the embodiment applied thereto, as shown in FIG. 17(C), the function of the first optical element 71' and the condenser lens array 720' compresses an intensity distribution of light 21ALP' from the lamp unit 21A and an intensity distribution of light 21BLP' from the lamp unit 21B in the y direction around the center 460L of the projection lens, compared with the intensity distributions of light 21ALP and 21BLP shown in FIG. 17(B). This means that respective distribution centers 21ALC' and 21BLC' are closer to the center 460L of the projection lens than the distribution centers 21ALC and 21BLC shown in FIG. 17(B). Compared with the projector-type display apparatus with the polarizing lighting device 60A applied thereto, the projector-type display apparatus with the polarizing lighting device 90 of the embodiment applied thereto has the improved utilization efficiency of light in the projection lens and the possibility of projecting and displaying brighter projection images.

In accordance with one modified structure, the condenser lenses 721' are also arranged in the areas filled with slant lines in FIG. 17(C) and the number of arrays of the flux division lenses 711' as well as the area of the reflectors in the lamp units 21A and 21B is increased correspondingly. This enables projection and display of further brighter projection images.

Figure 18:
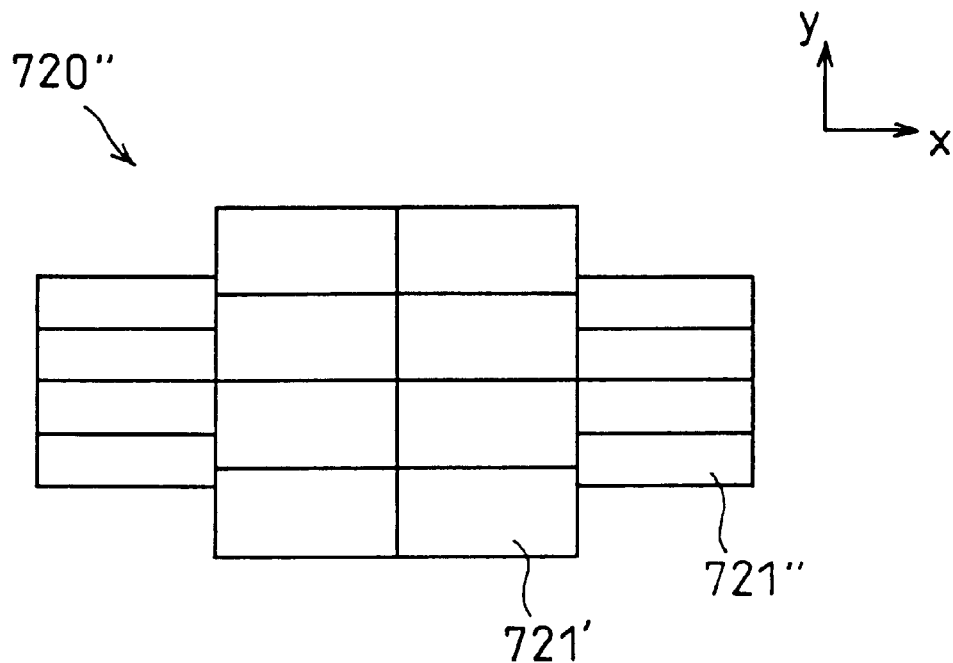
FIG. 18 shows another structure of the condenser lens array of FIG. 13.
Figure 19:
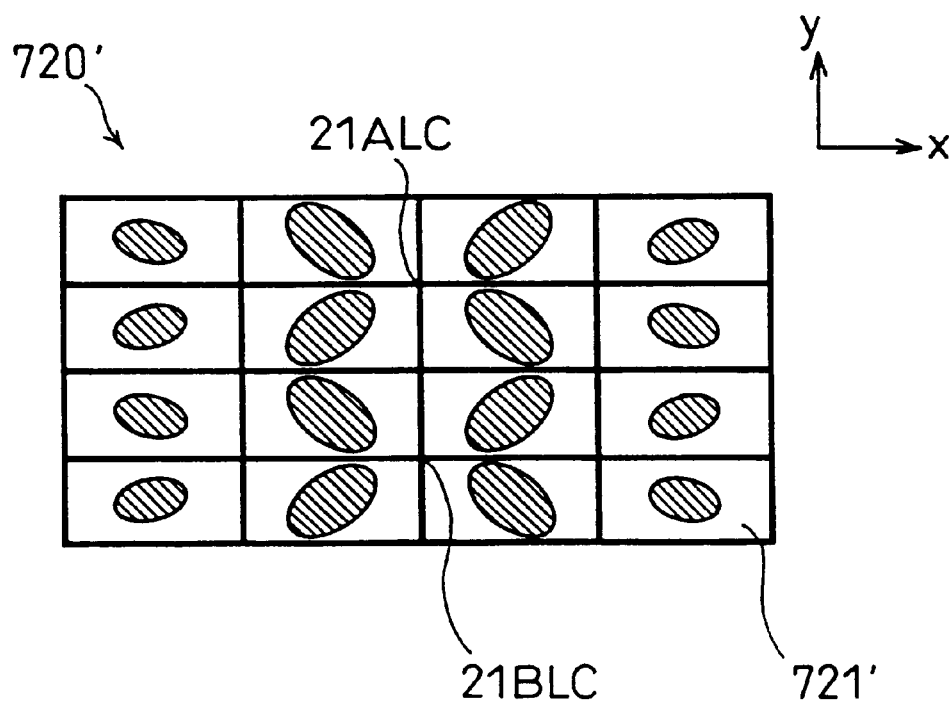
FIG. 19 shows converged images formed by a plurality of intermediate light fluxes in the vicinity of the condenser lens array of FIG. 13.

A condenser lens array 720" shown in FIG. 18 includes condenser lenses 721", which are arranged in the circumferential portion in the x direction and are smaller in the y direction than the condenser lenses 721' of the central portion. In case that the lamp units 21A and 21B of the polarizing lighting device 60A are arrayed in the y direction in the projector-type display apparatus 80 shown in FIG. 12, the converged images formed in the vicinity of the condenser lens array 720' by a plurality of intermediate light fluxes actually have the shapes which varies according to their positions as shown in FIG. 19. The light fluxes closer to the lamp center form larger converged images, whereas those farther from the lamp center form smaller converged images. The condenser lenses 721' apart from the lamp centers 21ALC and 21BLC of the lamp units 21A and 21B are reduced in size in the y direction as shown in FIG. 18. This further improves the utilization efficiency of the projection lens regarding the light fluxes passing through these rectangular lenses, and has the possibility of projecting and displaying brighter projection images. In the example of FIG. 18, the left-most row and the right-most row are reduced in size among the four rows of rectangular lenses (condenser lenses) in the condenser lens array 720'. The reduction of the size is, however, not restricted to this arrangement, but different rows may have different sizes according to the dimensions of the converged images. Not only the dimension of the rectangular lenses in the y direction but the dimension of the rectangular lenses of each row in the x direction may be changed according to the size of the converged images in the x direction. In another example, the respective rectangular lenses may have different dimensions in the y direction and the x direction according to the size of the converged images.

In the polarizing lighting device 90 of the embodiment, the aspect ratio of the condenser lenses 721' is two to one, whereas the aspect ratio of the flux division lenses 711' is four to three. The aspect ratio is, however, not restricted to these values. The aspect ratio of the condenser lenses should be set smaller than the aspect ratio of the flux division lenses, in order to enable the condenser lens array to include at least most of the converged images, which are converged and formed on the polarization separating surfaces and the reflection surfaces of the polarization separating units by the flux division lenses.

In the polarizing lighting device 90 of the embodiment, the dimension of the condenser lenses 721' in the y direction is set smaller than the dimension of the flux division lenses 711' in the y direction. This structure is also effective in the lighting device having a single lamp unit as the light source.

In this embodiment, the lamp units having the side-cut reflectors 220A and 220B as described in the first embodiment are used as the lamp units 21A and 21B. The lamp units having reflectors without any side cuts, however, exert the similar effects to those discussed above.

Like the polarizing lighting device 60 of the second embodiment (FIG. 8), the polarizing lighting device 90 of this embodiment includes an integrator optical system and a polarizing unit and thereby has the effects due to the integrator optical system and the polarizing unit as described in the second embodiment.

The polarizing lighting device 90 of this embodiment may have the structure which allows the two light source lamps to be turned on and off selectively. This structure enables the brightness of light to be adjusted in multiple steps, thereby attaining the required brightness and efficient power consumption.

Further, application of the lamp units including light source lamps of different spectra to a color projector-type display apparatus improves the color reproducibility.

(Fifth Embodiment)

FIG. 20 illustrates the positional relationship between dichroic mirrors and lamp units in a projector-type display apparatus including another lighting device embodying the present invention. FIGS. 20(A) and 20(B) schematically illustrate a red-light liquid-crystal device illuminated with red light fluxes which are separated from the light fluxes emitted from a lighting device 100 by a blue-green light reflection dichroic mirror 401 functioning as a color separating optical element. Although only the optical elements, a cross dichroic prism 450, the red-light liquid-crystal device 411, the blue-green light reflection dichroic mirror 401, and the lighting device 100, are shown in alignment for convenience in FIGS. 20(A) and 20(B), the only difference from the projector-type display apparatus 80 shown in FIG. 12 is that the polarizing lighting device 60A is replaced by the lighting device 100 of the embodiment.

As shown in FIGS. 20(A) and 20(B), the blue-green light reflection dichroic mirror 401 functioning as a color separating optical element is arranged substantially perpendicular to an x-z plane and at predetermined angles to a y-z plane and an x-y plane.

The lighting device 100 of the embodiment has a light source unit 110, which includes first and second lamp units 110A and 110B of identical structure and substantially the same size. The lamp units 110A and 110B respectively have light source lamps 120A and 120B and reflectors 130A and 130B of a paraboloidal, ellipsoidal, or circular shape. Like the first embodiment, the reflectors 130A and 130B of this embodiment have side cuts. The lamp units 110A and 110B are arranged virtually along the y axis. Namely the lamp units 110A and 110B are arrayed in the direction perpendicular to the direction of two output rays from the dichroic mirror 401.

Figure 22:
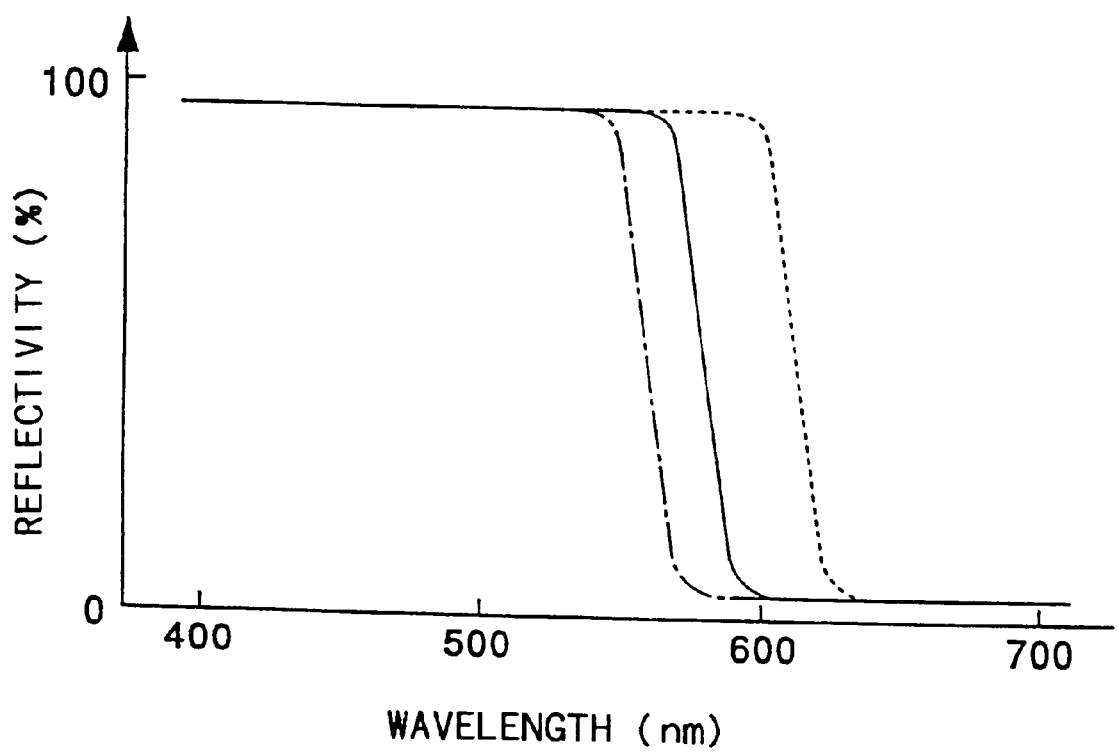
FIG. 22 is a graph showing color separation characteristics of a blue-green light reflection dichroic mirror.

FIG. 22 shows color separation characteristics of the blue-green light reflection dichroic mirror 401. When the light enters the blue-green light reflection dichroic mirror 401 at a predetermined angle, the dichroic mirror 401 allows only a red light component (not lower than approximately 600 nm) of the incident light to be transmitted, while causing the other light components (a blue light component and a green light component) to be reflected (the characteristics shown by the solid line in FIG. 22). Such color separation characteristics varies with the incident angle of the light entering the blue-green light reflection dichroic mirror 401. In case that the light does not enter the blue-green light reflection dichroic mirror 401 at the predetermined incident angle, the red light component led to the red-light liquid-crystal device 411 shows a color shift.

Figure 21:
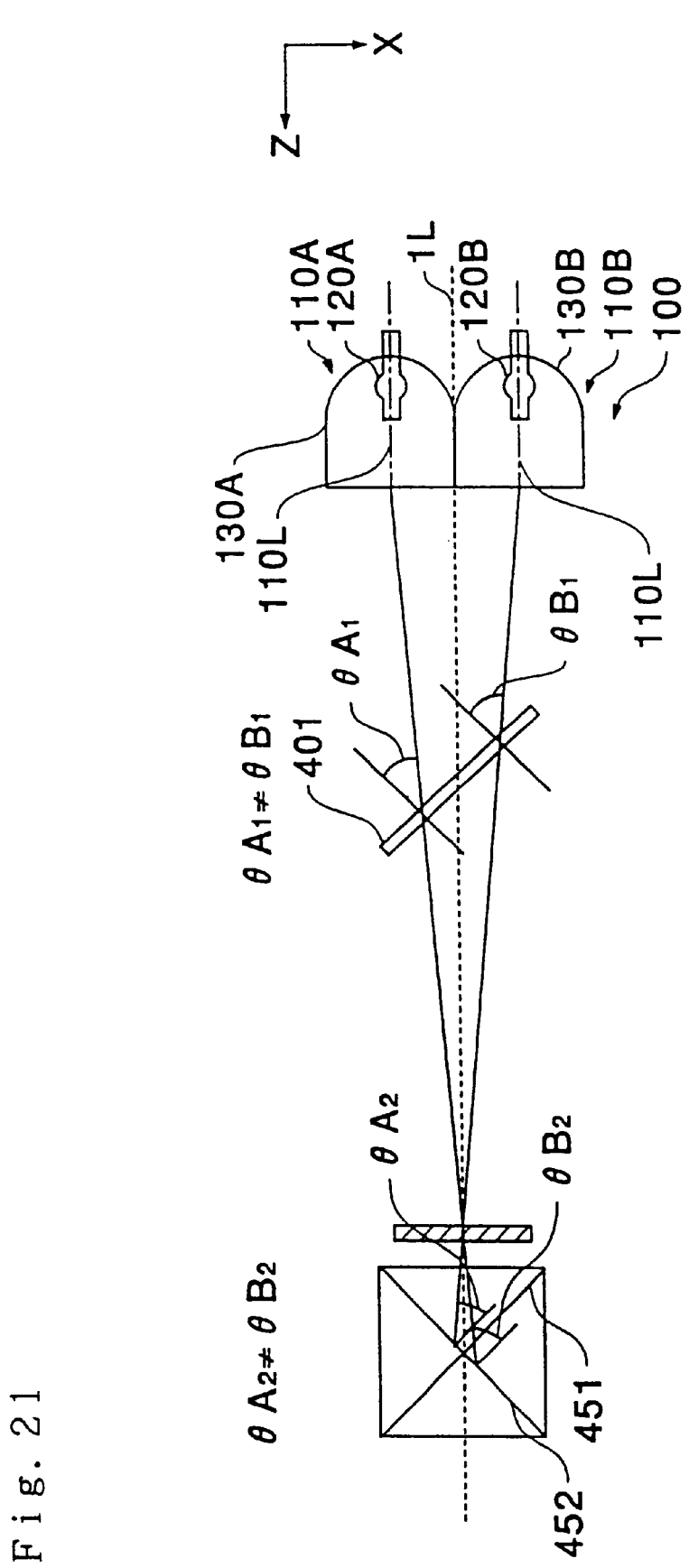
FIG. 21 shows the positional relationship between dichroic mirrors and lamp units arrayed in the x-axis direction.

In case that the lamp units 110A and 110B are arrayed in the x-axis direction as shown in FIG. 21, incident angles θA1 and θB1 of the rays emitted from the lamp units 110A and 110B to the blue-green light reflection dichroic mirror 401 are different from each other and deviated from the predetermined angle. For example, the light emitted from the lamp unit 110A accordingly has the characteristics shown by the broken line in FIG. 22, which are different from the desired color separation characteristics shown by the solid line in FIG. 22. The light emitted from the lamp unit 110B, on the other hand, has the characteristics shown by the one-dot chain line in FIG. 22, which are also different from the desired color separation characteristics shown by the solid line in FIG. 22. The respective output rays have different color separation characteristics. This causes a color shift in the red light component that passes through the dichroic mirror 401 and is led to the red-light liquid crystal device 411.

In the lighting device 100 of the embodiment, on the other hand, the lamp units 110A and 110B are arrayed substantially along the y axis as shown in FIGS. 20(A) and 20(B). This arrangement enables the rays emitted from the lamp units 110A and 110B to enter the blue-green light reflection dichroic mirror 401 at an identical incident angle. This makes the respective output rays have the same desired color separation characteristics, and thereby reduces the color shift of the red light component for illuminating the red-light liquid-crystal device 411.

This arrangement also enables the rays emitted from the lamp units 110A and 110B to enter a green light dichroic mirror 402 at an identical incident angle θ, like the blue-green light reflection dichroic mirror 401. This accordingly reduces the color shift of the light components for illuminating a green-light liquid crystal device 412 and a blue-light liquid-crystal device 413. The lighting device 100 of the embodiment illuminates liquid-crystal devices with rays of uniform brightness and no color shift.

This arrangement has similar effects on a red light reflection dichroic surface 451 and a blue light reflection dichroic surface 452 of the dichroic prism 450 as shown in FIGS. 20(A) and 20(B). Namely the rays emitted from the lamp units 110A and 110B to the dichroic surfaces 451 and 452 have identical incident angles θA2 and θB2. The lighting device 100 of the embodiment incorporated in the projector-type display apparatus effectively reduces the color shift in projection images.

The lighting device 100 of the embodiment includes two lamp units and thereby has the enhanced quantity of output light, like the embodiments described above.

As described above, the projector-type display apparatus with the lighting device 100 of the embodiment incorporated therein can produce projection images that are uniformly bright over the whole projection area and have substantially no color shift.

In this embodiment, the lamp units having the side-cut reflectors 130A and 130B as described in the first embodiment are used as the lamp units 110A and 110B. The lamp units having reflectors without any side cuts, however, attain the similar effects to those described above.

The lighting device 100 of the embodiment may further include an integrator optical system and a polarizing unit described above. In this case, the lighting device 100 has the effects due to the integrator optical system and the polarizing unit, in addition to the above effects. Namely the lighting device 100 attains the enhanced brightness and reduced unevenness of illuminance as well as the reduced color shift in projection images.

The lighting device 100 of this embodiment may have the structure which allows the two light source lamps to be turned on and off selectively. This structure enables the brightness of light to be adjusted in multiple steps if required, thereby attaining the required brightness and efficient power consumption. In the lighting device 100 of the embodiment, since the spectroscopic characteristics of the dichroic mirror and the prism do not change even when only one lamp is turned on, the projection images obtained have some decrease in brightness but are free of a color tone change.

(Other Embodiments of the Present Invention)

Although the third embodiment has referred to the projector-type display apparatus 80 with the polarizing lighting device 60A incorporated therein, which has the same structure as the polarizing lighting device 60, the lighting device 1 shown in FIG. 1 may be incorporated in the projector-type display apparatus 80 in place of the polarizing lighting device 60A. In this case, the small-sized light source unit reduces the size of the whole projector-type display apparatus.

In all the above embodiments, the lighting device of the present invention is applied to the projector-type display apparatus with transmission liquid-crystal devices. The lighting device of the present invention is also applicable to the projector-type display apparatus with reflection-type liquid-crystal devices.

The present invention is applicable to both front-projection type and rear-projection type display apparatuses. The front-projection type projects images from the side of observing the projection plane, whereas the rear-projection type projects images from the opposite side.

The present invention is not restricted to the above embodiments or their modified examples, but there may be many other modifications, changes, and alterations without departing from the scope or spirit of the main characteristics of the present invention.

The lighting device of the present invention is applicable to a variety of projector-type display apparatuses. The projector-type display apparatus of the present invention may be used to project and display images output from a computer or images output from a video cassette recorder on a screen.

What is claimed is:

1. A projector, comprising:
a lighting device having a plurality of lamp units, each the lamp unit including a light source lamp and a reflector that reflects light emitted from the light source lamp;
a color separation device that separates light emitted from the lighting device into at least two color light fluxes; and
a plurality of modulation devices that modulate the respective color light fluxes separated by the color separation device,
the projector further comprising:
a color combining device that combines the color light fluxes modulated by the plurality of modulation devices; and
a projection optical system that projects a composite light flux obtained by the color combining device onto a projection plane,
wherein when x, y, and z denote three directional axes perpendicular to one another and z represents a direction parallel to an optical axis of light emitted from the lamp unit, the color separation device has a color separation plane that is substantially perpendicular to an x-z plane and has predetermined angles with respect to a y-z plane and an x-y plane, and
the plurality of lamp units are arrayed substantially along the y direction.

2. A projector, comprising:
a lighting device having a plurality of lamp units, each the lamp unit including a light source lamp and a reflector that reflects light emitted from the light source lamp;
a color separation device that separates light emitted from the lighting device into at least two color light fluxes; and
a plurality of modulation devices that modulate the respective color light fluxes separated by the color separation device,
the projector further comprising:
a color combining device that combines the color light fluxes modulated by the plurality of modulation devices; and
a projection optical system that projects a composite light flux obtained by the color combining device onto a projection plane,
wherein when x, y, and z denote three directional axes perpendicular to one another and z represents a direction parallel to an optical axis of light emitted from the lamp unit, the color combining device has a dichroic surface,
the dichroic surface is arranged to be substantially perpendicular to an x-z plane and has predetermined angles with respect to a y-z plane and an x-y plane, and
the plurality of lamp units are arrayed substantially along the y direction.

3. The projector of claim 1, wherein the reflector of each the lamp unit has a shape obtained through cutting a concave surface of revolution, which is obtained by rotating a curve about an optical axis of the light source lamp, on at least one end adjoining to another lamp unit by a plane substantially perpendicular to a direction of the array of the lamp units.

4. The projector of claim 1, wherein the lighting device further comprises an integrator optical system having a first lens plate including a plurality of lenses and a second lens plate including a plurality of lenses.

5. The projector of claim 4, wherein the lighting device further comprises a polarizing device that converts light fluxes output from the second lens plate to light fluxes of a single polarization type having identical polarizing directions and outputting the light fluxes of the single polarization type.

6. The projector of claim 2, wherein the reflector of each lamp unit has a shape obtained through cutting a concave surface of reflection on at least one end adjoining to another lamp unit by a plane substantially perpendicular to a direction of the array of the lamp units.

7. The projector of claim 6, wherein the lighting device further comprises an integrator optical system having a first lens plate including a plurality of lenses and a second lens plate including a plurality of lenses.

8. The projector of claim 7, wherein the lighting device further comprises a polarizing device that converts light fluxes output from the second lens plate to light fluxes of a single polarization type having identical polarizing directions and outputs the light fluxes of the single polarization type.

* * * * *

UNITED STATES PATENT AND TRADEMARK OFFICE
CERTIFICATE OF CORRECTION

PATENT NO. : 6,471,358 B1 Page 1 of 1
DATED : October 29, 2002
INVENTOR(S) : Itoh et al.

It is certified that error appears in the above-identified patent and that said Letters Patent is hereby corrected as shown below:

<u>Title page,</u>
Item [63], Related U.S. Application Data, should read:

-- Related U.S. Application Data

[63] Continuation of application No. 09/051,916, filed as International Application No. PCT/JP97/02953, filed Aug. 25, 1997, now Patent No. 6,109,752 --

Signed and Sealed this

Nineteenth Day of August, 2003

JAMES E. ROGAN
*Director of the United States Patent and Trademark Office*